United States Patent
Omodaka et al.

(10) Patent No.: US 12,459,210 B2
(45) Date of Patent: Nov. 4, 2025

(54) MANAGEMENT APPARATUS, PRODUCTION SYSTEM, AND MANAGEMENT METHOD OF EXTRACTING A COMBINATION OF TWO OR MORE STRUCTURES

(71) Applicants: Katsuhiko Omodaka, Kanagawa (JP); Hidenori Shindoh, Tokyo (JP)

(72) Inventors: Katsuhiko Omodaka, Kanagawa (JP); Hidenori Shindoh, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 420 days.

(21) Appl. No.: 18/087,859

(22) Filed: Dec. 23, 2022

(65) Prior Publication Data
US 2023/0202116 A1    Jun. 29, 2023

(30) Foreign Application Priority Data

Dec. 28, 2021  (JP) .................................. 2021-213901
Jul. 1, 2022    (JP) .................................. 2022-106795

(51) Int. Cl.
*B29C 64/393* (2017.01)
*B33Y 50/02* (2015.01)

(52) U.S. Cl.
CPC ............ *B29C 64/393* (2017.08); *B33Y 50/02* (2014.12)

(58) Field of Classification Search
CPC .................................................. B29C 64/393
See application file for complete search history.

(56) References Cited

U.S. PATENT DOCUMENTS

| 8,858,856 B2 * | 10/2014 | Kozlak ................. B29C 64/188 264/308 |
| 2004/0148775 A1 | 8/2004 | Kobayakawa |
| 2016/0167313 A1 * | 6/2016 | Swanson ................. B29C 64/40 134/184 |
| 2017/0124223 A1 | 5/2017 | Maeda et al. |
| 2017/0249440 A1 * | 8/2017 | Lang ..................... B33Y 50/02 |
| 2018/0052444 A1 * | 2/2018 | Korsedal ................ G01B 11/16 |
| 2018/0196412 A1 | 7/2018 | Bisot et al. |
| 2019/0375009 A1 * | 12/2019 | Gibson ................... B22F 10/47 |
| 2020/0307108 A1 * | 10/2020 | FrantzDale ............. G06F 30/17 |
| 2021/0031460 A1 * | 2/2021 | Lobo Fenoglietto .. B33Y 10/00 |

(Continued)

FOREIGN PATENT DOCUMENTS

| JP | 2017-087718 | 5/2017 |
| JP | 2021-008113 | 1/2021 |
| JP | 2021-165035 | 10/2021 |

(Continued)

OTHER PUBLICATIONS

Partial European Search Report issued May 22, 2023 in European Patent Application No. 22215971.7, 20 pages.

(Continued)

*Primary Examiner* — Suresh Suryawanshi
(74) *Attorney, Agent, or Firm* — XSENSUS LLP

(57) ABSTRACT

A management apparatus includes circuitry to manage multiple structures including a fabrication object fabricated by a fabrication apparatus in a fabrication area of the fabrication apparatus and extract a combination of two or more structures from the multiple structures based on shape information of the multiple structures.

20 Claims, 32 Drawing Sheets

(56) References Cited

U.S. PATENT DOCUMENTS

2021/0308950 A1    10/2021   Kobayashi et al.
2022/0164821 A1    5/2022   Nagatsuka et al.

FOREIGN PATENT DOCUMENTS

| | | |
|---|---|---|
| JP | 2022-084528 | 6/2022 |
| JP | 2022-085467 | 6/2022 |
| KR | 20160046105 A * | 4/2016 |
| WO | WO2017/094791 A1 | 6/2017 |
| WO | WO2017/122462 A1 | 7/2017 |
| WO | WO2018/234331 A1 | 12/2018 |

OTHER PUBLICATIONS

Ferdinando Vitolo, et al., "Controlling form errors in 3D printed models associated to size and position on the working plane", International Journal On Interactive Design and Manufacturing (IJIDEM), vol. 12, No. 3, Dec. 7, 2017, 9 pages, XP036560105.

* cited by examiner

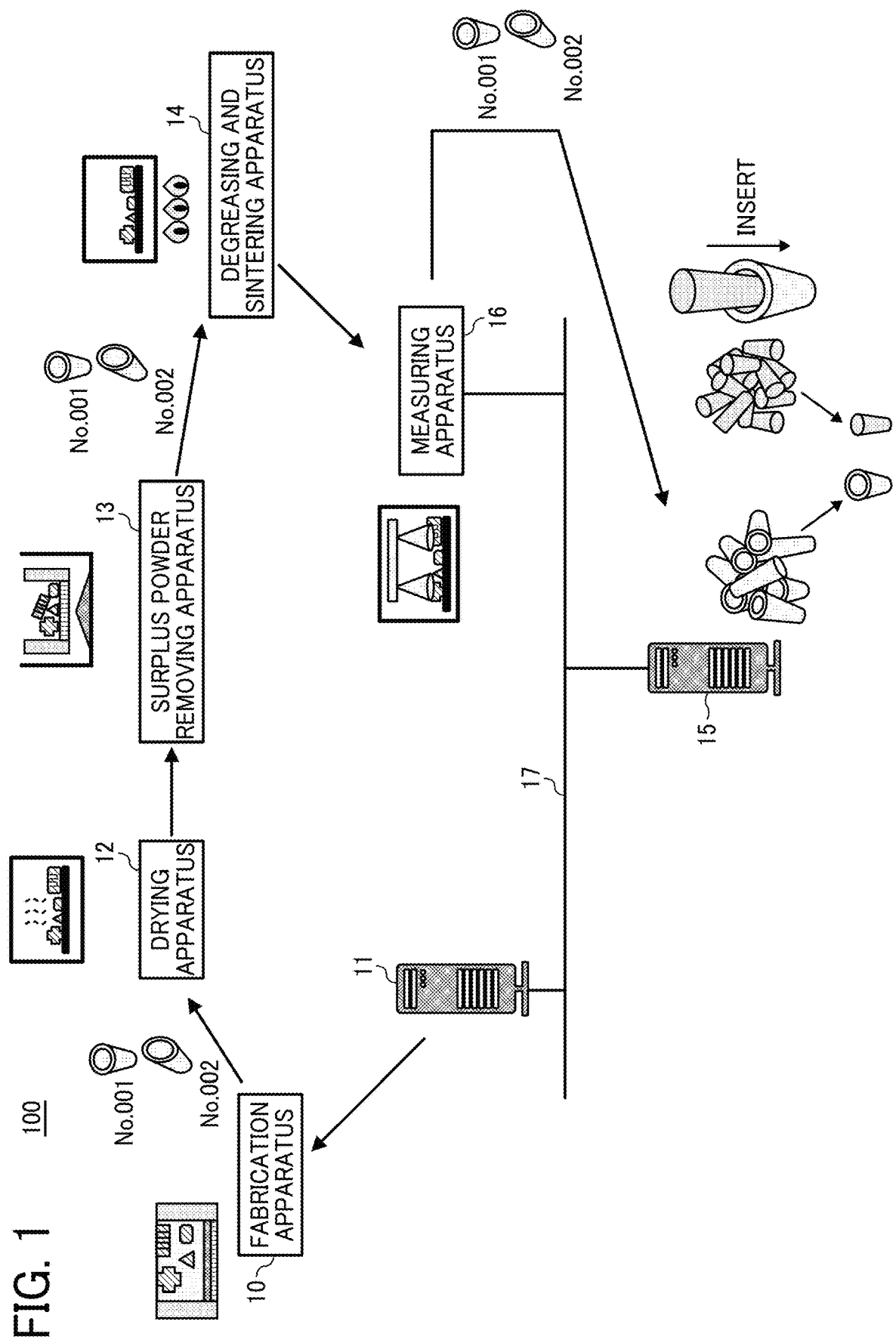

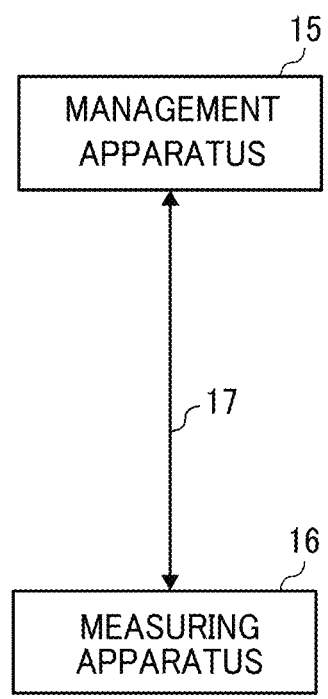 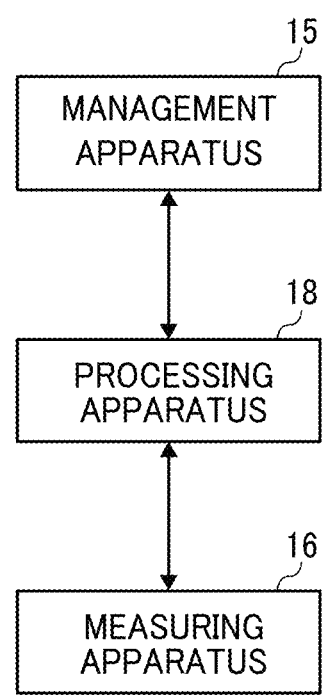

FIG. 10
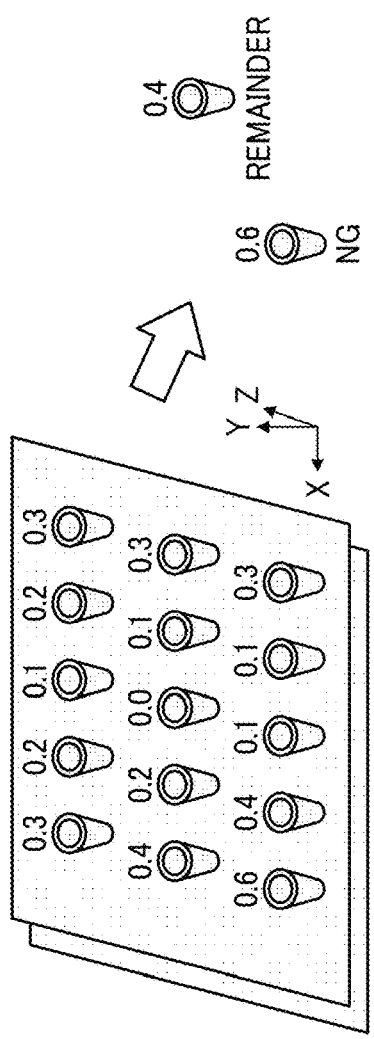
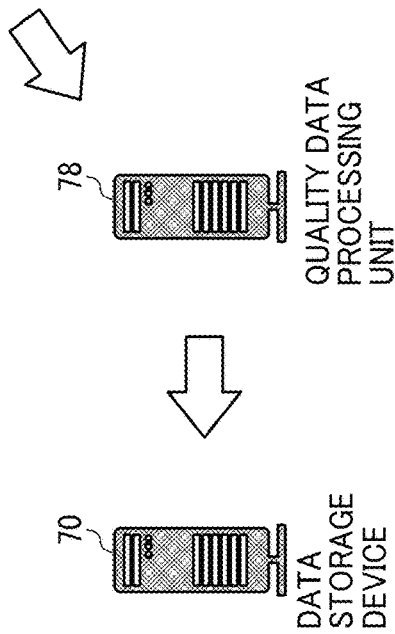

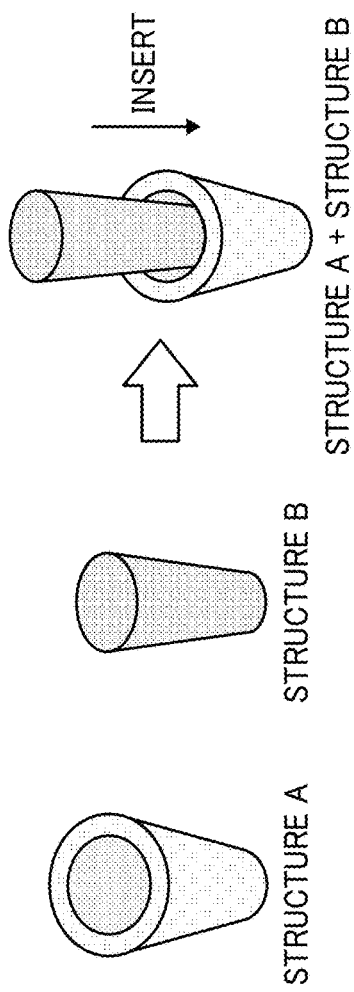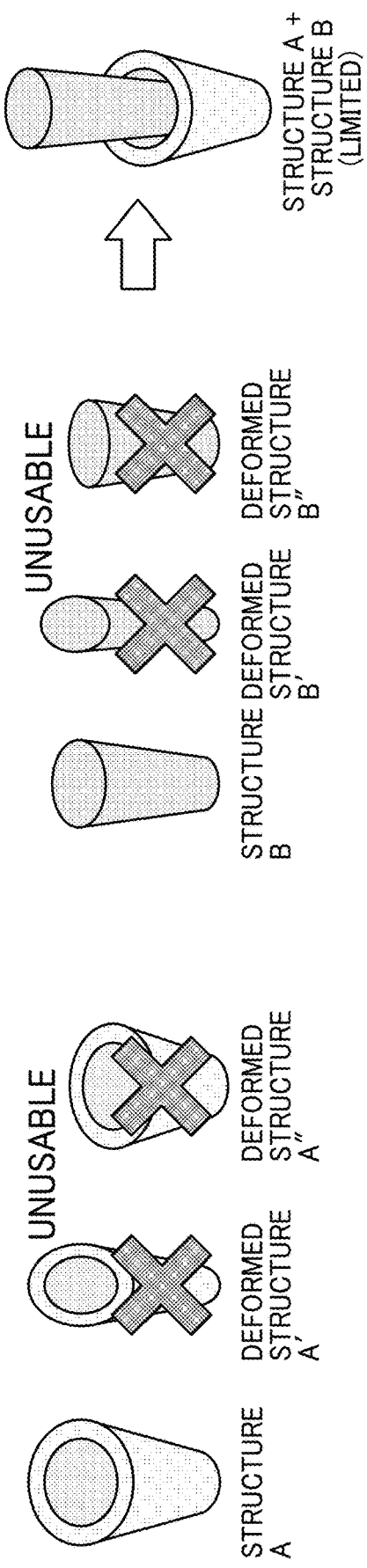

FIG. 26
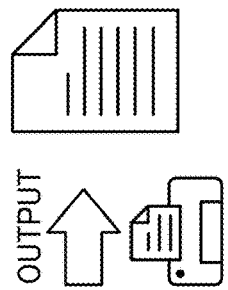
| COMPONENT/COMBINATION | Assy001 | Assy002 | Assy003 |
|---|---|---|---|
| A | No.001 | No.002 | No.003 |
| FEATURE POINT SIZE | Φ10.01 | Φ9.95 | 10.30 |
| B | No.003 | No.001 | No.002 |
| FEATURE POINT SIZE | Φ10.05 | Φ10.00 | 10.25 |
| PRESS-FIT STRENGTH DESIGN VALUE: X±0.1 | X+0.05 | X−0.05 | X+0.1 |
| DETERMINATION | OK | OK | OK |
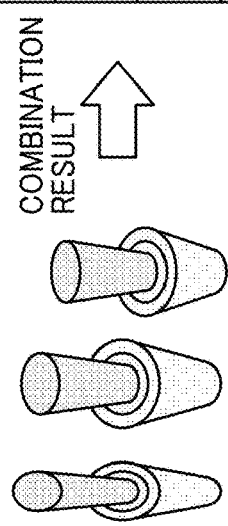

MANAGEMENT APPARATUS, PRODUCTION SYSTEM, AND MANAGEMENT METHOD OF EXTRACTING A COMBINATION OF TWO OR MORE STRUCTURES

CROSS-REFERENCE TO RELATED APPLICATIONS

This patent application is based on and claims priority pursuant to 35 U.S.C. § 119(a) to Japanese Patent Application Nos. 2021-213901, filed on Dec. 28, 2021, and 2022-106795, filed on Jul. 1, 2022, in the Japan Patent Office, the entire disclosure of each of which is hereby incorporated by reference herein.

BACKGROUND

Technical Field

Embodiments of the present disclosure relate to a management apparatus that manages a structure fabricated by a fabrication apparatus, a production system including the management apparatus, and a management method of extracting a combination of two or more structures.

Related Art

A three-dimensional (3D) printer as a fabrication apparatus fabricates structures having various three-dimensional shapes. However, all of multiple structures fabricated may not have the shapes and dimensions as designed.

SUMMARY

Embodiments of the present disclosure describe an improved management apparatus that includes circuitry to manage multiple structures including a fabrication object fabricated by a fabrication apparatus in a fabrication area of the fabrication apparatus and extract a combination of two or more structures from the multiple structures based on shape information of the multiple structures.

According to other embodiments of the present disclosure, there are provided a management method that includes extracting a combination of two or more structures from multiple structures including a fabrication object fabricated by a fabrication apparatus based on shape information of the multiple structures.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a diagram of a production system according to an embodiment of the present disclosure;

FIGS. 2A and 2B are block diagrams illustrating an example of connection between a measuring apparatus and a management apparatus according to an embodiment of the present disclosure;

FIG. 10 is a diagram illustrating acquisition of quality data from an unnecessary structure according to an embodiment of the present disclosure;

FIGS. 12A and 12B are diagrams illustrating an example of manufacture of a product into which two structures are combined;

FIG. 26 is a diagram illustrating an output of a result of combinations of two structures;

Figure 3:
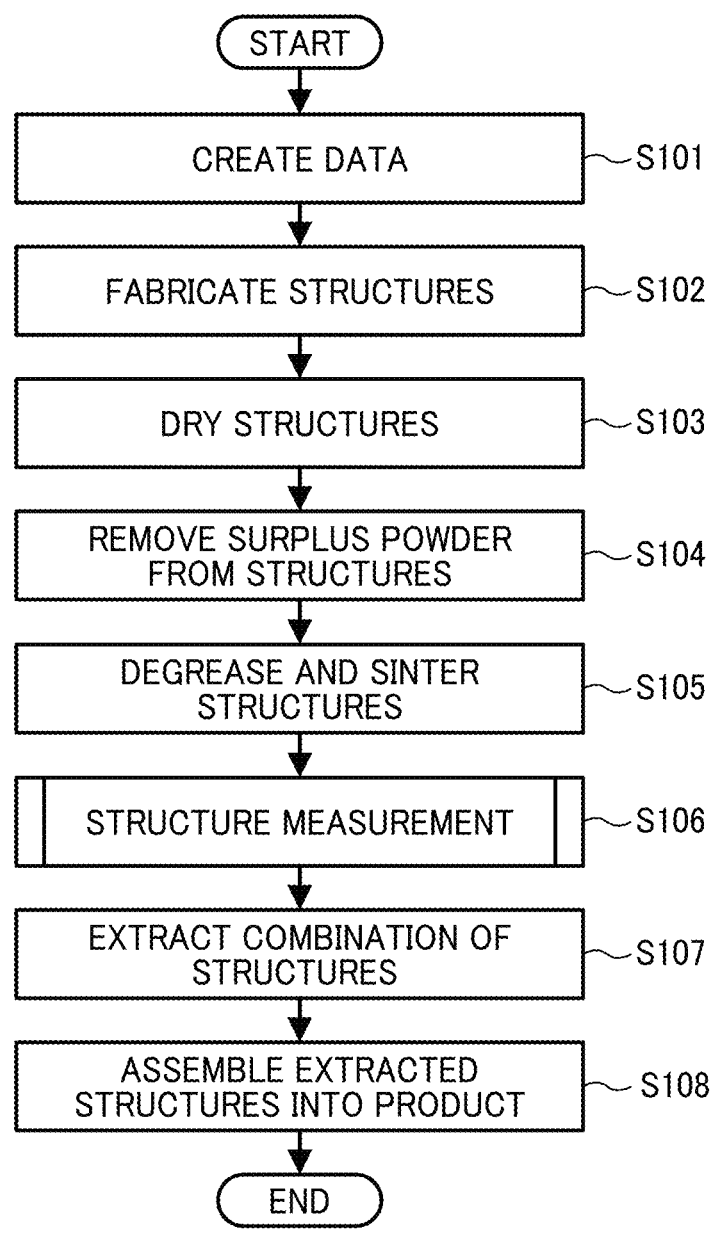
FIG. 3 is a flowchart of manufacturing a product in the production system.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Although the present disclosure is described below with reference to some embodiments, embodiments of the present disclosure are not limited to the embodiments described below.

FIG. 1 is a schematic diagram of a production system 100 according to an embodiment of the present disclosure. The production system 100 in FIG. 1 includes at least a fabrication apparatus 10, an information processing apparatus 11, a drying apparatus 12, a surplus powder removing apparatus 13, a degreasing and sintering apparatus 14, a management apparatus 15, a measuring apparatus 16, and a network 17.

In the production system 100 illustrated in FIG. 1, a fabrication object as a structure is fabricated by the fabrication apparatus 10, a combination of two or more structures is extracted from multiple structures including the fabrication object based on shape information of the structure, and a product is manufactured by combining the two or more structures based on the extracted combination.

In the present disclosure, the structure has a three-dimensional shape fabricated by the production system 100. Examples of the structure include an object at any stage during fabrication by the fabrication apparatus 10, after being dried, after surplus powder is removed, after being degreased, and after being sintered. The fabricated structure is, for example, some kind of component, and two or more structures of different types are assembled into a product.

The production system 100 includes the fabrication apparatus 10 that fabricates structures as two or more types of fabrication objects to be assembled into a product, and the information processing apparatus 11 that creates fabrication data for fabricating each structure for the fabrication apparatus 10.

The information processing apparatus 11 implements a design tool as software and creates data as shape data representing a three-dimensional shape. The design tool enables input of design conditions such as types of powder and a fabrication liquid to be used, and can generate data based on the input design conditions. The design tool is not limited and may be any software that can create data.

The fabrication apparatus 10 communicates with the information processing apparatus 11 and fabricates multiple structures based on data received from the information processing apparatus 11. Multiple structures of one type may be fabricated at a time based on one piece of data, or multiple structures of two or more types corresponding to a combination may be fabricated at a time based on the one piece of data.

The fabrication apparatus 10 may be a 3D printer employing a selective laser sintering (SLS) method in which a laser beam is selectively emitted, an electron beam melting (EBM) method in which an electron beam is emitted, a binder jetting (BJ) method in which the fabrication liquid is applied, or the like. In FIG. 1, the fabrication apparatus 10 employing the BJ method is described as an example, but a method other than the BJ method is also applicable to the fabrication apparatus 10.

The fabrication apparatus 10 repeatedly forms one layer containing powder and having a predetermined thickness, and discharges the fabrication liquid from a discharge nozzle to a predetermined position on the surface of the layer to fabricate a layered object in which multiple layers is laminated. The layered object is dried into a solidified object. Powder adheres to the solidified object as surplus powder, and the surplus powder is removed from the solidified object.

The solidified object is called a green body in which the fabrication liquid is interposed between powder particles of the green body and the powder particles are simply adhered to each other by the fabrication liquid. Since the green body has a low strength, the resin component of the fabrication liquid is volatilized and removed from the green body to reduce the distance between the powder particles to densify the green body, and the green body is sintered, thereby enhancing the strength.

For this reason, the production system 100 includes the drying apparatus 12 that dries the layered object, the surplus powder removing apparatus 13 that removes the surplus powder, and the degreasing and sintering apparatus 14 that volatilizes and removes the resin component of the fabrication liquid and sinters the green body. Each of the drying apparatus 12 and the degreasing and sintering apparatus 14 includes a heating device such as a heater. The surplus powder removing apparatus 13 may use any method such as a method using a sieve, a method of brushing off the surplus powder with a brush, and a method using centrifugal separation to remove the surplus powder.

The management apparatus 15 extracts a combination of two or more structures based on shape information of the fabricated structures, and stores information related to the combination to manage the multiple structures including the fabrication object fabricated by the fabrication apparatus 10. The measuring apparatus 16 measures each dimension of the fabricated structure to acquire the shape information of the structure.

Examples of the measuring apparatus 16 include a camera, a 3D scanner, a caliper, a height gauge, a scale, a surface-roughness meter, a three-dimensional measuring device, an ultrasonic measuring device, a computed tomography (CT) device, an X-ray device, or a density measuring device. Examples of the shape information measured by the measuring apparatus 16 include an image, two-dimensional and three-dimensional coordinates of the structure, mesh information, a point cloud, surface roughness, internal defects, density, and the like.

As an example of the measuring apparatus 16, a 3D scanner is described. The 3D scanner is classified into contact type or non-contact type. In the contact type, a sensor or a probe is brought into contact with a structure to acquire coordinates of a contact position, thereby acquiring shape information of the structure with high accuracy.

The non-contact type includes a pattern light projection type and a laser beam type. The pattern light projection type projects a pattern onto a structure, recognizes the distortion of the pattern due to the unevenness of the structure, and measures the distance from the scanner to the structure to acquire coordinates. Since the pattern light projection type scans a large area at a time, the time taken for the entire scan can be reduced. In addition, shape information with little noise can be acquired.

The laser beam type projects a laser beam onto a structure. Examples of a method of acquiring coordinates include triangulation, time-of-flight, and phase difference. In the triangulation, a sensor detects reflected light of a laser beam emitted to the structure to measure the distance to acquire coordinates. In the time-of-flight, the distance is calculated from the time until the reflected light of the laser beam emitted to the structure reaches the sensor to acquire coordinates. In the phase difference, the laser beams having different wavelengths are emitted to the structure, and the distance is calculated from the phase difference of the reflected light to acquire coordinates. In the laser beam method, the structure can be scanned regardless of the size of the structure.

The management apparatus 15 extracts a combination of two or more structures based on a measurement result by the measuring apparatus 16. The management apparatus monitors each structure from fabrication to sintering in order to identify each of multiple structures fabricated at a time.

Identification information (ID) is assigned to each structure. The identification information is uniquely assigned to identify each structure, and any means may be used for identification. For example, the identification information can be added to the data so that the identification information is formed on the surface of the structure. Thus, for example, a camera captures an image of the identification information on the surface of the structure from fabrication to sintering to identify each structure.

Alternatively, each structure may be identified by a position in each apparatus from fabrication to removal of surplus powder. After the removal of surplus powder, the identification information may be written on the surface of the structure by hand, or a label on which the identification information is printed is attached to the surface of the structure to identify each structure.

The management apparatus 15 manages information related to the extracted combination using the assigned identification information. Two or more structures are assembled in accordance with the information related to the combination to manufacture a product satisfying a certain quality. In the example illustrated in FIG. 1, two types of structures are fabricated, and one structure is inserted into the other structure, thereby manufacturing a product.

The management apparatus 15 is connected to the network 17 together with the information processing apparatus 11 and the measuring apparatus 16 to communicate with the information processing apparatus 11 and the measuring apparatus 16. Accordingly, the management apparatus 15 can receive the measurement result from the measuring apparatus 16 via the network 17, and when the simulation is performed, the management apparatus 15 can transmit a simulation result to the information processing apparatus 11. The network 17 may be either wired or wireless, and may be any of a local area network (LAN), a wide area network (WAN), or the Internet. The fabrication apparatus 10 may be connected to the network 17.

In FIG. 1, one fabrication apparatus 10 fabricates two or more structures as multiple structures, but two or more structures may be fabricated by multiple fabrication apparatuses 10. In this case, the multiple fabrication apparatuses 10 may be the same type or may be a combination of different types.

Alternatively, two or more structures may be fabricated by the fabrication apparatus 10 combined with another apparatus. In this case, another apparatus refers to an apparatus other than the fabrication apparatus 10, such as a mold. Similarly to the fabrication apparatus 10, another apparatus is connected to the information processing apparatus 11, the management apparatus 15, and the measuring apparatus 16 via the network 17.

A structure fabricated by another apparatus is processed, managed, and measured by the information processing apparatus 11, the management apparatus 15, and the measuring apparatus 16 connected via the network 17, respectively. Another apparatus communicates with the information processing apparatus 11 and fabricates multiple structures based on data received from the information processing apparatus 11. Note that another apparatus may not be connected to the network 17.

The management apparatus 15 assigns identification information to a structure manufactured by another apparatus to manage the structure. The measuring apparatus 16 measures each dimension and the like of the manufactured structure to acquire shape information of the structure.

The management apparatus 15 extracts a combination of two or more structures based on the measurement result by the measuring apparatus 16. In addition to the structures fabricated by the fabrication apparatus 10, the management apparatus 15 can extract a combination of the structure fabricated by the fabrication apparatus 10 and a structure manufactured by another apparatus. Further, the management apparatus 15 can extract a combination of structures manufactured by another apparatus.

Thus, for example, even when a structure is manufactured by another apparatus at a site different from a site of the fabrication apparatus 10 and is transported, the management apparatus 15 can trace all the structures, thereby manufacturing a product satisfying a certain quality.

As illustrated in FIG. 2A, the management apparatus 15, which is connected to the measuring apparatus 16 via the network 17, may manage the measurement result by the measuring apparatus 16. As illustrated in FIG. 2B, a processing apparatus 18 connected to the measuring apparatus 16 may primarily process the measurement result and may transmit suitable shape information and the like to the management apparatus 15 to manage the measurement result. In this case, the processing apparatus 18 as an edge computer primarily processes the measurement result and reduce an amount of information to be transmitted, thereby reducing the communication cost without network congestion.

FIG. 3 is a flowchart of manufacturing a product in the production system 100 including the fabrication apparatus 10. In step S101, the information processing apparatus 11 creates data. When the fabrication apparatus 10 fabricates a structure based on the data, the information processing apparatus 11 transmits the created data to the fabrication apparatus 10. In step S102, the fabrication apparatus 10 fabricates the structure based on the received data.

The structure as the layered object fabricated by the fabrication apparatus 10 is conveyed to the drying apparatus 12, and the drying apparatus 12 dries the structure in step S103. After being dried, the structure is conveyed to the surplus powder removing apparatus 13, and the surplus powder removing apparatus 13 removes surplus powder from the structure in step S104.

In step S105, the degreasing and sintering apparatus 14 degreases and sinters the structure as a green body from which the surplus powder has been removed. In step S106, the measuring apparatus 16 measures each dimension and the like of the structure. In step S107, the management apparatus 15 extracts a combination of two or more structures from the multiple fabricated structures based on the measurement result by the measuring apparatus 16 (i.e., the shape information). In step S108, the management apparatus 15 determines a combination of structures based on the extracted combination to assemble the structures into a product, and then the process ends.

Step S103, step S104, or step S105 can be omitted in accordance with the type of the fabrication apparatus 10 as appropriate. In the present embodiment, the structures are fabricated by the fabrication apparatus 10, but structures manufactured by another apparatus may be measured and managed. In this case, the measuring apparatus 16 measures each dimension of the structure manufactured by another apparatus in step S106.

With Reference to the measurement result of the dimensions of the structure, there may be a fabrication area in which the structure has low fabrication accuracy, which does not satisfy a predetermined reference in quality (i.e., an unsatisfied fabrication area). The predetermined reference is set by a user in advance, for example. A structure fabricated in the fabrication area with the low fabrication accuracy, which does not satisfy the quality reference, is discarded, thereby wasting a material of the structure.

A fabrication area is preferably changed so that the material is not arranged in the unsatisfied fabrication area with the low fabrication accuracy for the next fabrication. In the present embodiment, the fabrication area is changed for the next fabrication, but the fabrication area may be changed for fabrication subsequent to the next fabrication. In this case, if a fabrication environment changes due to component replacement of the fabrication apparatus 10 or the like, the fabrication area may be changed, and the fabrication apparatus 10 may fabricates structures in the entire fabrication area again.

Figure 4:
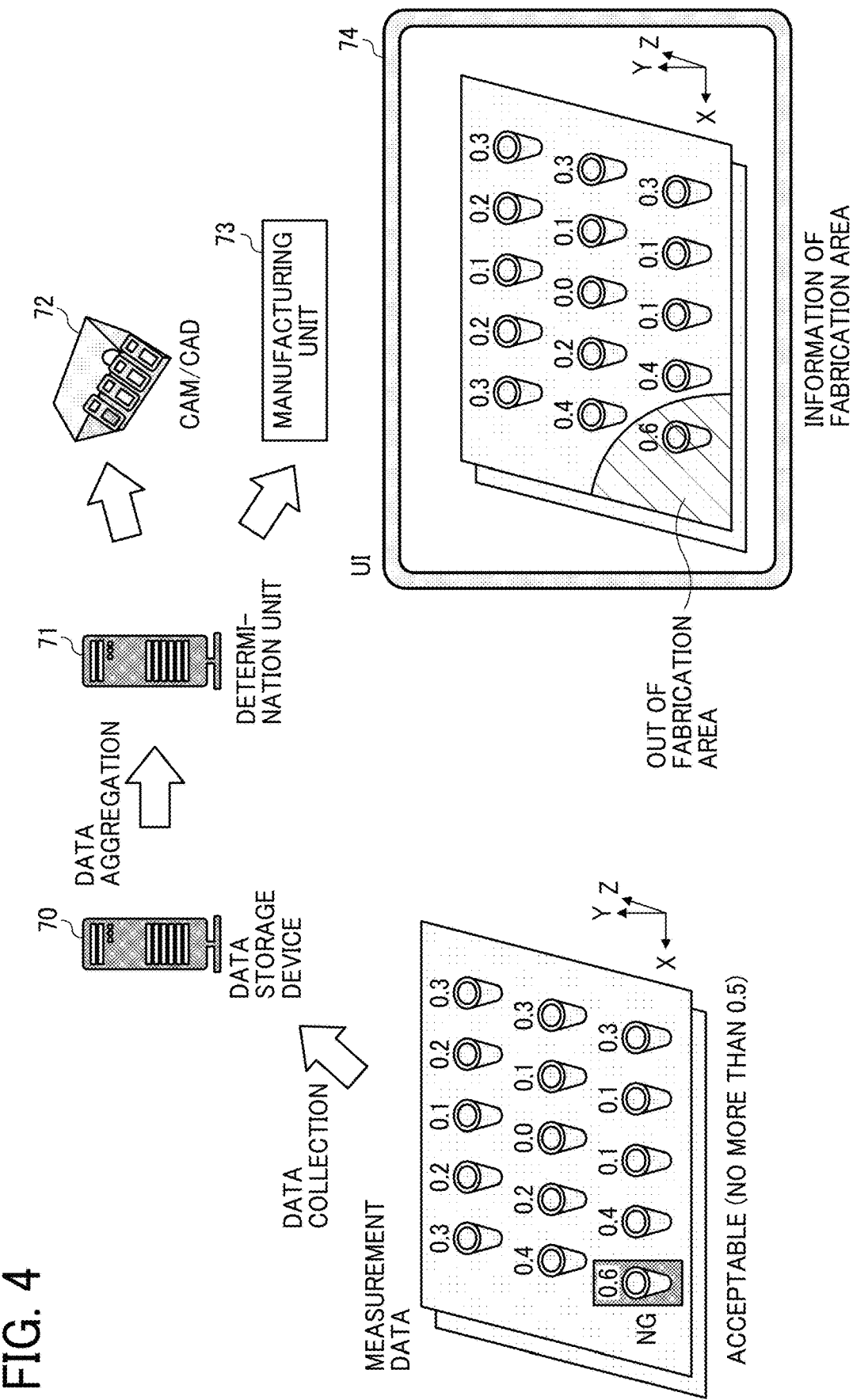
FIG. 4 is a diagram illustrating a change of a fabrication area according to an embodiment of the present disclosure.

FIG. 4 is a diagram illustrating the change of the fabrication area in step S106 illustrated in FIG. 3. The measurement result of each dimension of the structure acquired in step S106 is stored and accumulated in a data storage device 70 of the management apparatus 15 or a separated data storage apparatus.

Since fabrication accuracy of the structure varies depending on locations in the fabrication area, a determination unit 71 of the management apparatus 15 determines whether a fabrication quality of the structure at each location in the fabrication area satisfies the predetermined reference, that is, whether the structure has a sufficient accuracy and is acceptable, based on the accumulated measurement results of the multiple structures.

For example, when the difference of 0.5 mm or less between a diameter of the structure actually fabricated and measured (i.e., a measured dimension), and a designed diameter of the structure (i.e., a designed dimension) is acceptable, the determination unit 71 determines, based on the measurement result (measurement data) that a structure at the location having the largest coordinate in the X direction and the smallest coordinate in the Y direction in the fabrication area exceeds 0.5 mm and rejects the structure, that is, the structure is no good (NG) as illustrated in FIG. 4.

The determination unit 71 transmits a determination result (e.g., the unsatisfied fabrication area) to a computer aided manufacturing (CAM)/a computer aided design (CAD) 72, and reflects the determination result as fabrication area data to cause the CAM/CAD 72 to exclude the unsatisfied fabrication area from the fabrication area. The CAD is a system for creating shape data of a three-dimensional shape (i.e., the fabrication data), and the CAM is a system for creating processing data from the shape data created by the CAD. When the determination result is reflected in the next fabrication, the CAM/CAD 72 is inhibited from placing the material at the location in the fabrication area at which the structure is rejected (i.e., the unsatisfied fabrication area) according to the determination result.

In addition, the determination unit 71 transmits the determination result to a manufacturing unit 73 of the fabrication apparatus 10 and so on as the fabrication area data for the next fabrication to causes the manufacturing unit 73 to change a satisfied fabrication area in which a structure among the multiple structures satisfies the predetermined reference and the multiple structures are to be fabricated in the fabrication area in the next fabrication. Thus, the determination unit 71 causes a user interface (UI) 74, which is a display unit of the manufacturing unit 73, to display information of the location in the fabrication area newly rejected (i.e., the unsatisfied fabrication area), that is, out of the fabrication area data, thereby instructing an operator to exclude the rejected location from the fabrication area in which the structures are to be fabricated.

The UI 74 colors the rejected location in the fabrication area or indicates the measurement result (numerical value) along with the rejected location to distinguish the rejected location from the other locations in the fabrication area in which structures have an acceptable quality (i.e., the satisfied fabrication area).

Note that the UI 74 is not limited to the above example, such as coloring or indicating numerical value, as long as the UI 74 can display the information so as to distinguish the rejected location from the other acceptable locations in the fabrication area.

Figure 5:
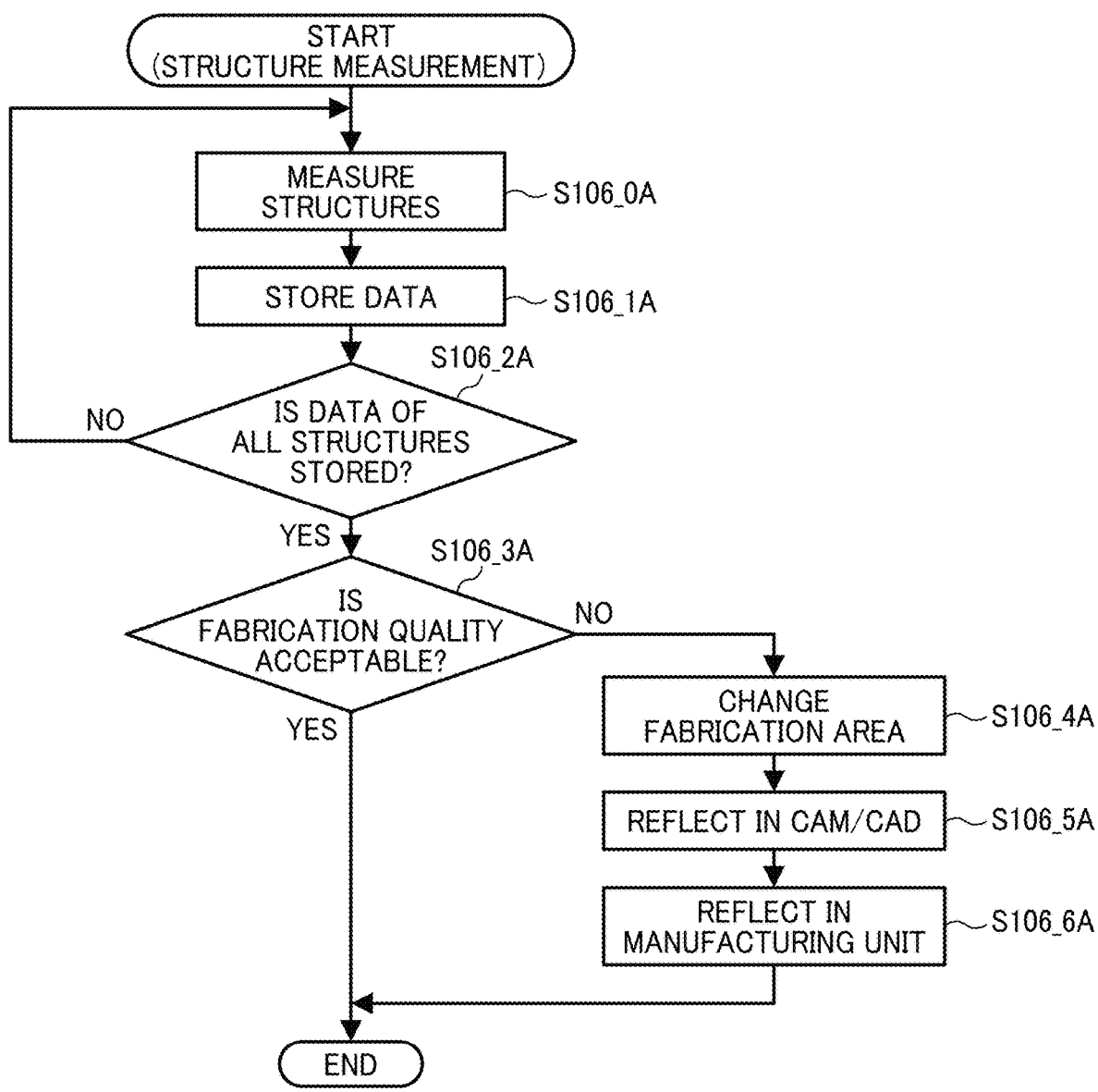
FIG. 5 is a flowchart of the change of the fabrication area.

FIG. 5 is a flowchart of the change of the fabrication area. The measuring apparatus 16 measures the dimensions of the structure in step S106_0A, and then the management apparatus 15 stores and accumulates the measurement result in the data storage device 70 in step S106_1A.

In step S106_2A, the determination unit 71 determines whether the measurement results for all of the fabricated structures have been stored in the data storage device 70. If all the measurement results have not been stored, the process returns to step S106_0A, and if all the measurement results have been stored, the process proceeds to step S106_3A.

In step S106_3A, the determination unit 71 determines whether the fabrication quality of the structure fabricated at each location in the fabrication area is acceptable. When all the structures are acceptable, the process ends. On the other hand, when there is a rejected structure, the process proceeds to step S106_4A, and the determination unit 71 changes the fabrication area and indicates to an operator that the location in which the rejected structure is fabricated is out of the fabrication area.

The determination unit 71 reflects the change of the fabrication area in the CAM/CAD 72 in step S106_5A and reflects the change of the fabrication area in the manufacturing unit 73 in step S106_6A. Here, the change of the fabrication area is reflected in the CAM/CAD 72, and then in the manufacturing unit 73, but the order of the reflection is not limited thereto. For example, the change of the fabrication area may be reflected in the manufacturing unit 73 first, or may be reflected in the CAM/CAD 72 and in the manufacturing unit 73 in parallel. After the change of the fabrication area is reflected, the process ends.

Figure 6:
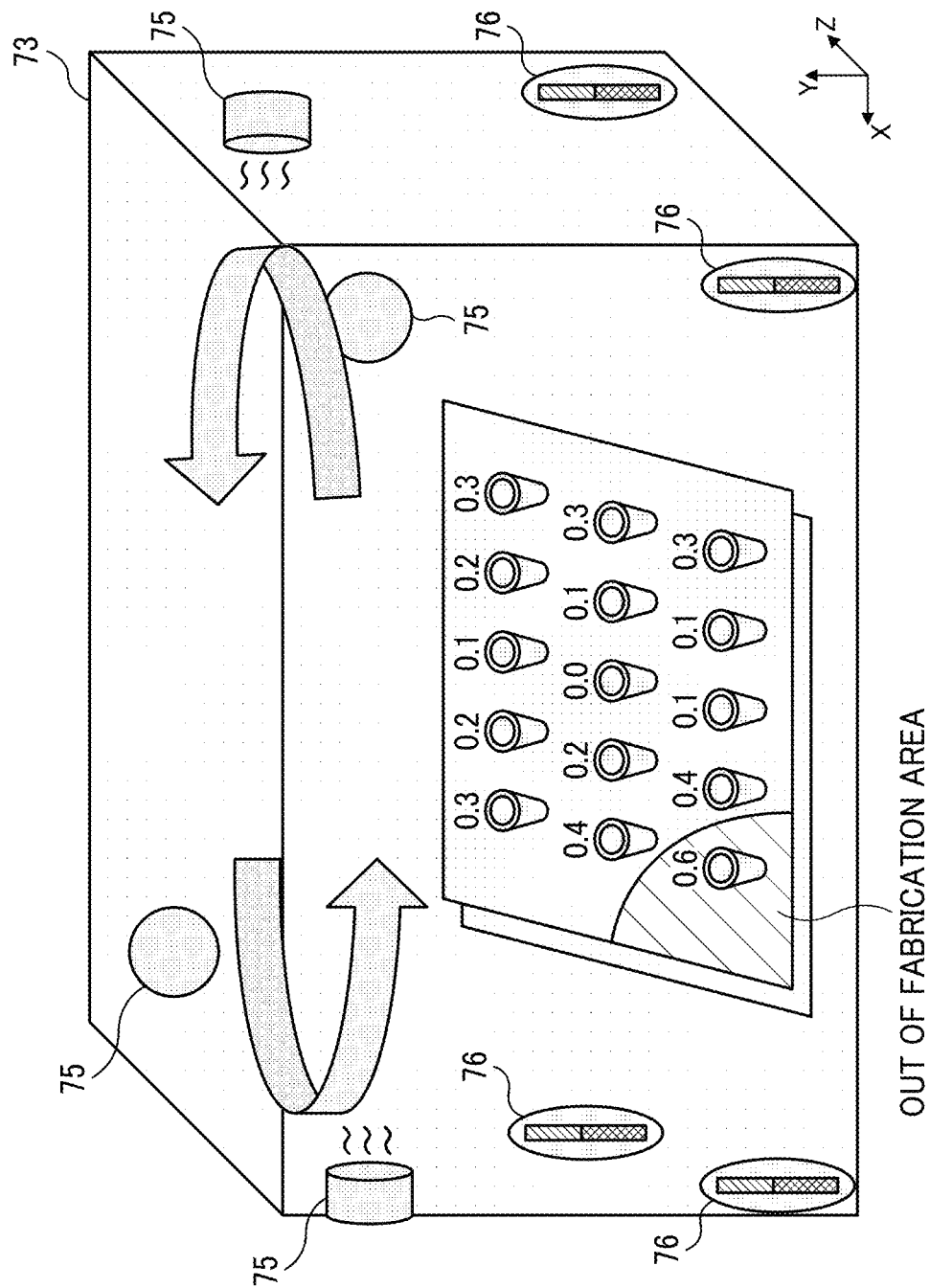
FIG. 6 is a diagram illustrating maintenance when the fabrication area is changed.

FIG. 6 is a diagram illustrating maintenance when the fabrication area is changed. The manufacturing unit 73 includes a fan 75 and a heater 76 to dry the layered object and sinter the green body. When the determination unit 71 determines to change the fabrication area, the fan 75 or the heater 76 may deteriorate over time, or a state of various drive components may change, causing the fabrication environment to vary. Accordingly, when the determination unit 71 changes the fabrication area, a maintenance operation such as adjustment and component replacement can be performed.

Figure 7:
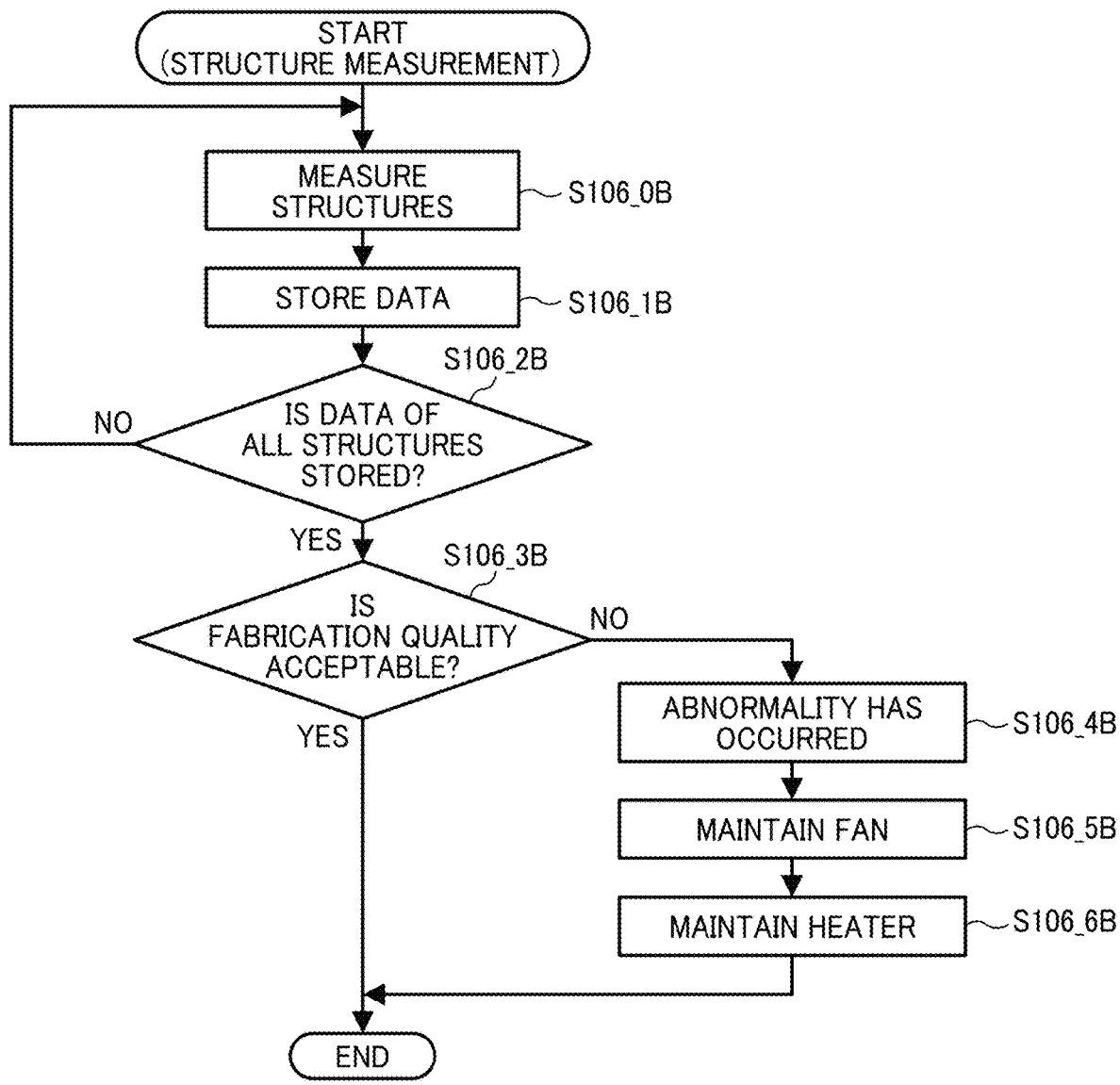
FIG. 7 is a flowchart of the maintenance when the fabrication area is changed.

FIG. 7 is a flowchart of the maintenance when the fabrication area is changed. Since step S106_0B to step S106_3B are the same as step S106_0A to step S106_3A illustrated in FIG. 5, the description thereof is omitted here.

When the determination unit 71 determines that there is a rejected structure in step S106_3B, the process proceeds to step S106_4B, the determination unit 71 determines that an abnormality occurs in the manufacturing unit 73 and determines to perform the maintenance operation based on the measurement result of the multiple structures. The manufacturing unit 73 maintains the fan 75 in step S106_5B and maintains the heater 76 in step S106_6B.

The maintenance operation can be performed not only on the fan 75 and the heater 76 but also on other devices and components related to the fabrication. The order of maintenance is not limited to the order of the fan 75 and the heater 76. For example, the maintenance may be performed in the order of the heater 76 and fan 75, or maintenance may be performed on the fan 75 and the heater 76 in parallel. After the maintenance operation, the process ends.

With reference to the measurement result obtained by measuring each dimension of the structure, the determination unit 71 can specify (determine) a location in which the structure having the fabrication quality satisfying the predetermined reference and having high accuracy is fabricated (i.e., a specified area). The fabricated structure having high accuracy (i.e., a high accuracy structure) has substantially the same dimensions as designed. Such a high accuracy structure can be provided as a high-value-added, high-grade product.

Figure 8:
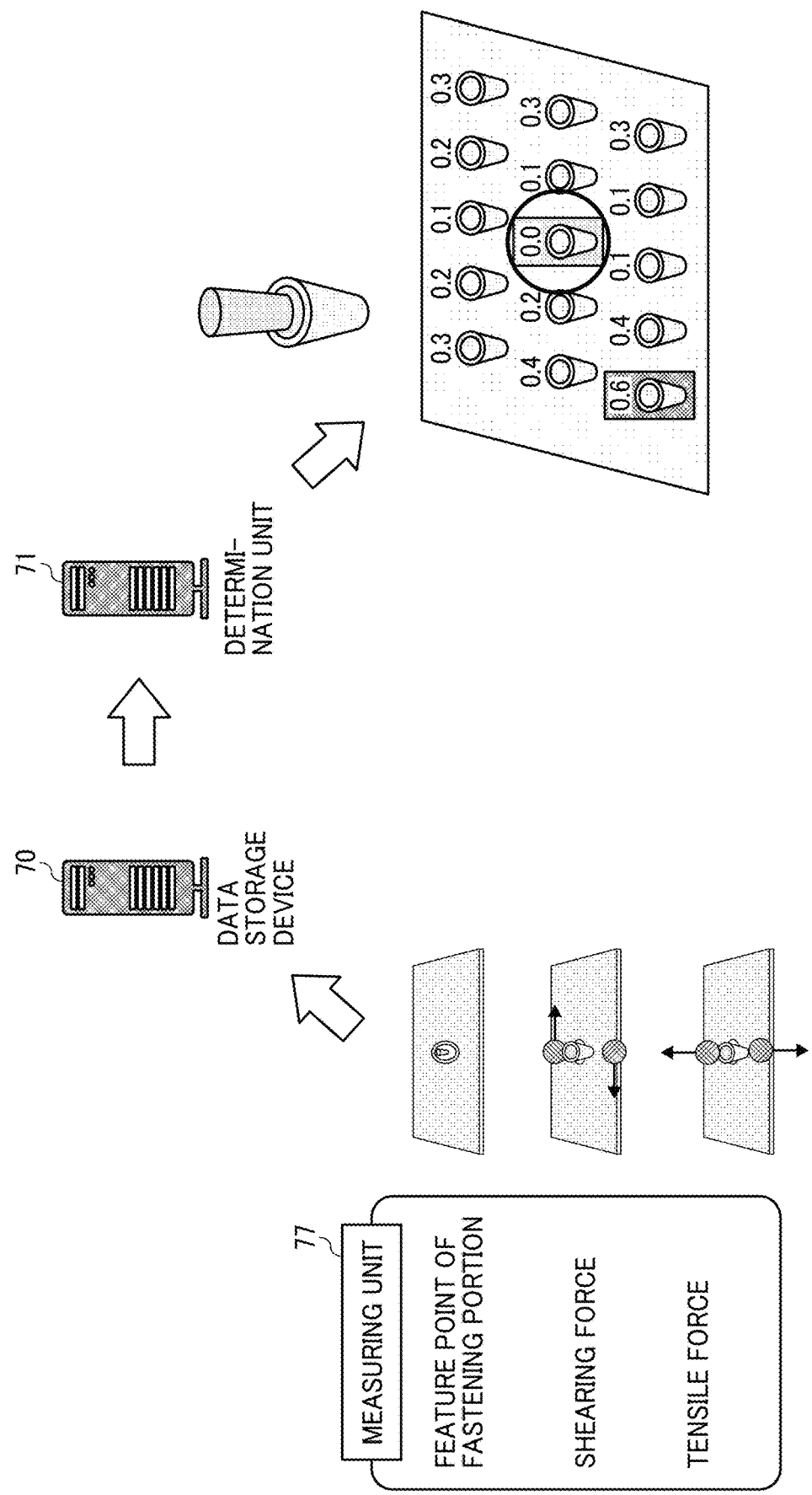
FIG. 8 is a diagram illustrating determination of a location in which a high accuracy structure is fabricated according to an embodiment of the present disclosure.

FIG. 8 is a diagram illustrating determination of a location in which a high accuracy structure is fabricated. A measuring unit 77 of the measuring apparatus 16 measures a feature point, shearing force, tensile force, and the like of a fastening portion of the structures as information for the fabrication quality at the location in the fabrication area. The measurement result is stored in the data storage device 70.

The determination unit 71 determines the location in which the high accuracy structure is fabricated (i.e., the specified area) based on the stored measurement result. The determination unit 71 transmits the determination result to the manufacturing unit 73 and instructs the manufacturing unit 73 to display the fabrication area in which a specific structure is indicated, for example, in different color, with marking, or the like on the UI 74.

In the example illustrated in FIG. 8, the location of the high accuracy structure is surrounded by a circle in the fabrication area displayed on the UI 74. In this example, the high accuracy structure has a dimensional difference of less than 0.05 mm between the designed diameter and the measured diameter, which is 0.0 mm when rounded off to the first decimal place. That is, difference between a designed dimension and a measured dimension is minimum in the specified area.

The determination unit 71 determines the high accuracy structure based on, but not limited to, the diameter of the structure, and may determine the high accuracy structure based on another element such as a length of the structure, or multiple elements including another element.

Figure 9:
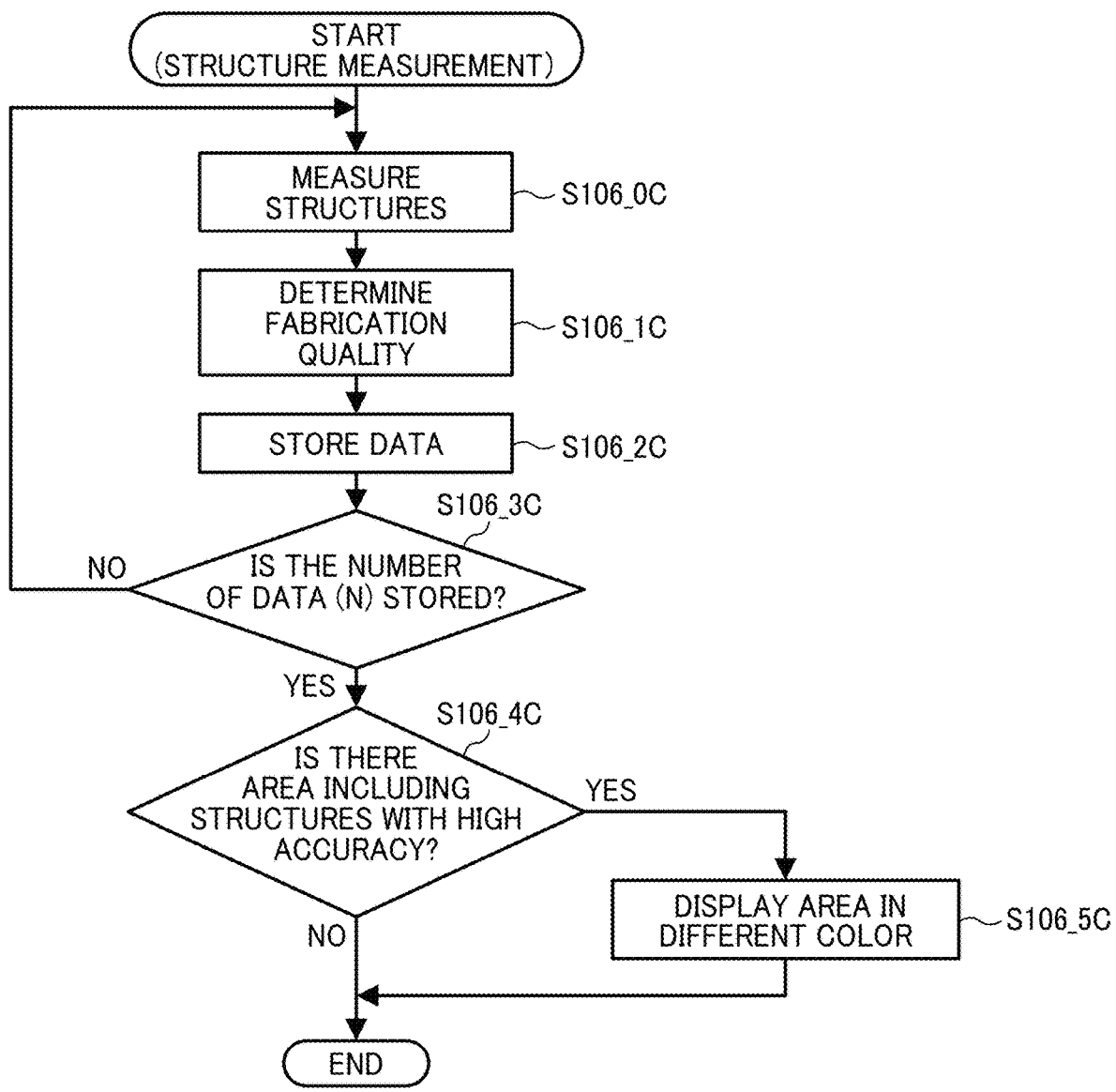
FIG. 9 is a flowchart of the determination of the location of the high accuracy structure.

FIG. 9 is a flowchart of the determination of a location of the high accuracy structure. The measuring unit 77 measures the dimensions of the structure in step S106_0C, and then the determination unit 71 determines the fabrication quality of the structure at each location in the fabrication area in step S106_1C.

In step S106_2C, the data storage device 70 stores information of the determined fabrication qualities. In step S106_3C, the determination unit 71 determines whether information of the fabrication qualities of N structures is stored, where N is an integer of 1 or more. When the information of the fabrication qualities of N structures is not stored, the process returns to step S106_0C.

When the information of the fabrication qualities of N structures is stored in step S106_3C, the process proceeds to step S106_4C, and the determination unit 71 determines whether there is a location of the high accuracy structure. When there is a location of the high accuracy structure, the process proceeds to step S106_5C, and the determination unit 71 transmits the measurement result and information indicating which location is displayed in a different color to the manufacturing unit 73 and instructs the UI 74 of the manufacturing unit 73 to display the information of the location. Then, the process ends. On the other hand, when there is no location of the high accuracy structure, the process ends without displaying the information of the location.

Based on the measurement result, the determination unit 71 determines to exclude a location in which a structure not satisfying the predetermined reference is fabricated from the fabrication area. In this determination, the structure that does not satisfy the predetermined reference is defined as an unnecessary structure.

Even when structures satisfy the predetermined reference, if the same number of counterpart structures to be combined is not present, some structures beyond the number of the counterpart structures become remainders, that is, the remainder is also the unnecessary structure.

The quality of the structure can be evaluated by the feature point, the shearing force, the tensile force, and the like of the fastening portion of the structures. Even though the quality of a part of the unnecessary structure can be evaluated, if the unnecessary structure is discarded without being evaluated, the unnecessary structure causes waste of material.

The unnecessary structure may be combined with another unnecessary structure into a product having an acceptable quality. Therefore, it is desirable to acquire quality data of a part of the unnecessary structure which can be evaluated so as to utilize the quality data to combine structures.

FIG. 10 is a diagram illustrating the acquisition of the quality data from the unnecessary structure. The determination unit 71 determines which structure is unnecessary based on the measurement result. As illustrated in the table in FIG. 10, in the case of a hollow cylindrical structure, the determined unnecessary structure is classified into NG in shape, NG in lateral size (e.g., width or diameter), NG in length, and remainder.

The quality of the hollow cylindrical structure into which a columnar structure is to be inserted can be evaluated based on the feature point, the shearing force, and the tensile force of the fastening portion. The shearing force displaces the inner surface of the structure in the direction indicated by arrows illustrated in the middle row of the table in FIG. 10. The tensile force pulls the structure in the direction indicated by arrows illustrated in the bottom row of the table in FIG. 10.

A part of the unnecessary structure which can be evaluated in quality is different depending on the classification. When the shape or the lateral size is NG, the length of the unnecessary structure is substantially the same as the designed length, and thus the tensile force can be evaluated in quality. When the length is NG, the shape and the diameter of the unnecessary structure are substantially the same as the designed shape and the designed diameter, and thus the feature point of the fastening portion and the shearing force can be evaluated in quality. In the case of the remainder, in addition to the shape and the diameter, the length is also substantially the same as the designed length, so that all of the feature point, the shearing force, and the tensile force of the fastening portion can be evaluated.

The measuring unit 77 measures a part of the unnecessary structure which can be evaluated in quality. For example, when a certain unnecessary structure has a length which can be evaluated in quality, the measuring unit 77 measures the length.

A quality data processing unit 78 of the management apparatus 15 acquires a measurement result of a part of the unnecessary structure, which can be evaluated in quality, as quality data, associates the acquired quality data with identification information assigned to each structure, and transmits the quality data to the data storage device 70 to store the quality data.

Figure 11A:
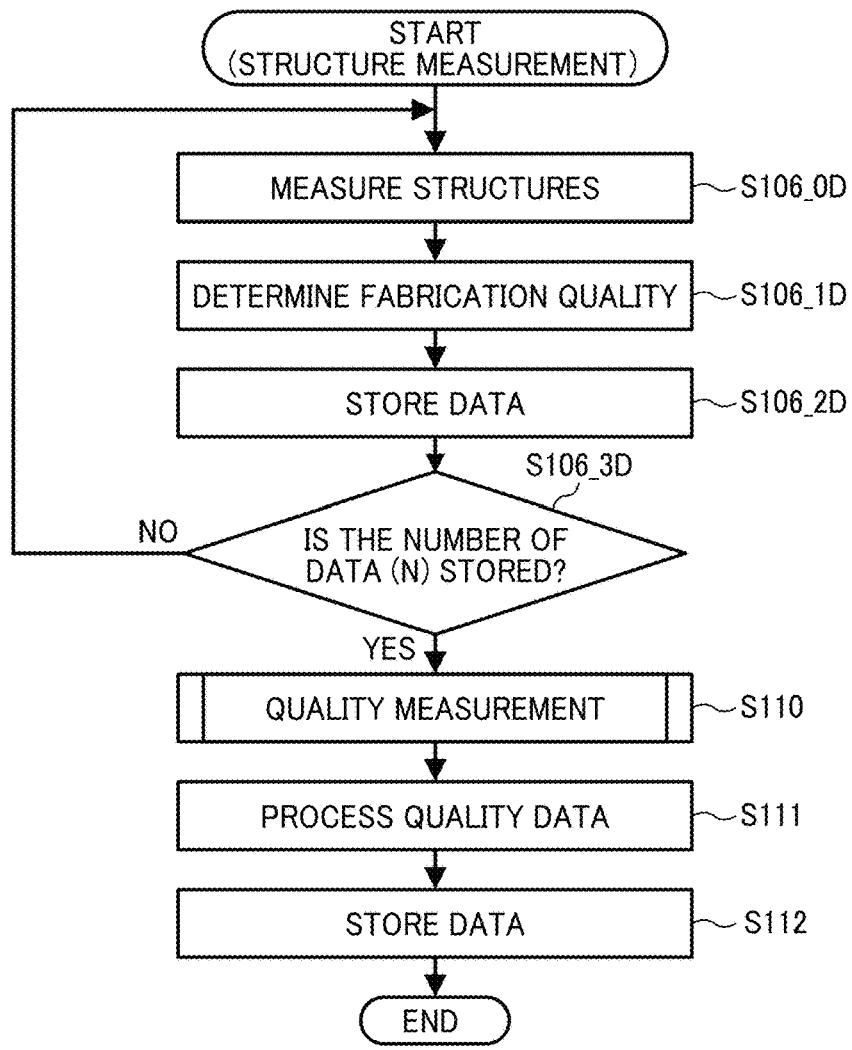
FIGS. 11A and 11B are flowcharts of the acquisition of the quality data from the unnecessary structure.
Figure 11B:
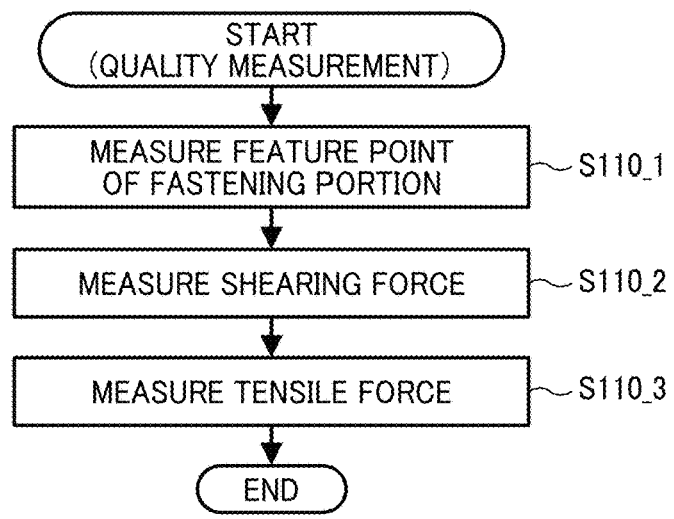

FIGS. 11A and 11B are flowcharts of the acquisition of the quality data from the unnecessary structure. Since step S106_0D to step S106_3D illustrated in FIG. 11A are the same as step S106_0C to step S106_3C illustrated in FIG. 9, the description thereof is omitted here.

When the information of the fabrication qualities of N structures is stored in step S106_3D, the process proceeds to step S110, and the measuring unit 77 measures a part of the unnecessary structure which can be evaluated in quality. Specifically, as illustrated in FIG. 11B, the measuring unit 77 measures the shape and dimensions of the feature point of the fastening portion in step S110_1, measures the shearing force in step S1102, and measures the tensile force in step S1103. All the feature point, the shearing force, and the tensile force are measures in the above example, but only the tensile force in step S110_3 may be measured as illustrated in the table in FIG. 10 when the shape or the lateral size is NG.

With reference again to FIG. 11A, the quality data processing unit 78 acquires the measurement result as quality data in step S111 and stores the quality data in the data storage device 70 in step S112, and then the process ends.

The quality data is stored in association with the identification information assigned to the structure.

With reference again to FIG. 3, in step S107, the management apparatus 15 extracts a combination of two or more structures from the structures fabricated by the fabrication apparatus 10 and the structures manufactured by another apparatus. In step S108, the management apparatus 15 determines a combination of structures based on the extracted combination to assemble the structures into a product.

The information related to the combination is used when the two or more structures are assembled into a product. In addition, the information related to the combination can be used for a simulation for estimating the deformation of the structure and the shape of the structure to be fabricated when using data created by the information processing apparatus 11.

When the fabrication apparatus 10 fabricates multiple structures formed of powder at a time, it is difficult to form an entire layer having uniform thickness and uniform density, in which the powder is spread. Accordingly, the fabrication liquid may permeate into the layer differently depending on the location in the fabrication area, and heat transfer may differ depending on the arrangement of the structures in each apparatus such as the drying apparatus 12.

For this reason, all of the multiple structures fabricated do not have the shape and dimensions as designed. Therefore, in a comparative example, structures within the allowable range satisfies the predetermined reference and are assembled into a product, and structures out of the allowable range are discarded.

In the example illustrated in FIGS. 12A and 12B, a hollow cylindrical structure A and a columnar structure B to be inserted into a hollow portion of the structure A are fabricated as two or more structures, and the structure B is inserted into the structure A to manufacture a product.

As illustrated in FIG. 12A, when the structure A and the structure B are fabricated in the designed shape, each of the structure A and the structure B has a substantially circular cross section, and the hollow portion of the structure A has a diameter slightly larger than the structure B. As a result, the structure B can be inserted into the structure A to manufacture a product.

On the other hand, as illustrated FIG. 12B, a deformed structure A', a deformed structure A", a deformed structure B', and a deformed structure B" out of the allowable range, which are deformed beyond the specified tolerance, are unusable.

The tolerance is a difference between a maximum value and a minimum value of the allowable range. A structure to be combined with another structure basically has a strict tolerance. The structure out of the tolerance is unusable for a product, and the unusable structure is discarded.

In FIG. 12B, in the deformed structures A' and A", the difference in length between the major axis direction and the minor axis direction of the oval cross section of the hollow portion exceeds the tolerance, and in the deformed structures B' and B", the difference in length between the major axis direction and the minor axis direction of the oval cross section exceeds the tolerance.

As illustrated in FIG. 12B, the oval cross section of the hollow portion of the deformed structure A' and the oval cross section of the deformed structure B' are deformed in the same direction, and the amount of deformation is substantially the same. The oval cross section of the hollow portion of the deformed structure A" and the oval cross section of the deformed structure B" are deformed in the same direction, which is different from the deformed direction of the deformed structure A' and the deformed structure B', and the amount of deformation is substantially the same. In this case, the deformed structure B' can be inserted into the deformed structure A', and the deformed structure B" can be inserted into the deformed structure A".

When a product into which the deformed structure A' and the deformed structure B' (or the deformed structure A" and the deformed structure B") are assembled satisfies predetermined conditions such as an insertion length and an insertion pressure to be provided, and the quality of the product is sufficient, if the deformed structure A' and the deformed structure B' (or the deformed structure A" and the deformed structure B") are discarded, the material of the structures is wasted. The predetermined conditions are set by a user in advance, for example.

In the present embodiment, the dimensions of the deformed structure A' and the deformed structure B' to be combined, and the dimensions of the deformed structure A" and the deformed structure B" to be combined are measured, which are the structures to be discarded, and the management apparatus 15 extract a combination of such two structures (e.g., the deformed structures A' and B' or the deformed structures A" and B") which can be assemble into a product having sufficient quality based on the measurement result.

Figure 13:
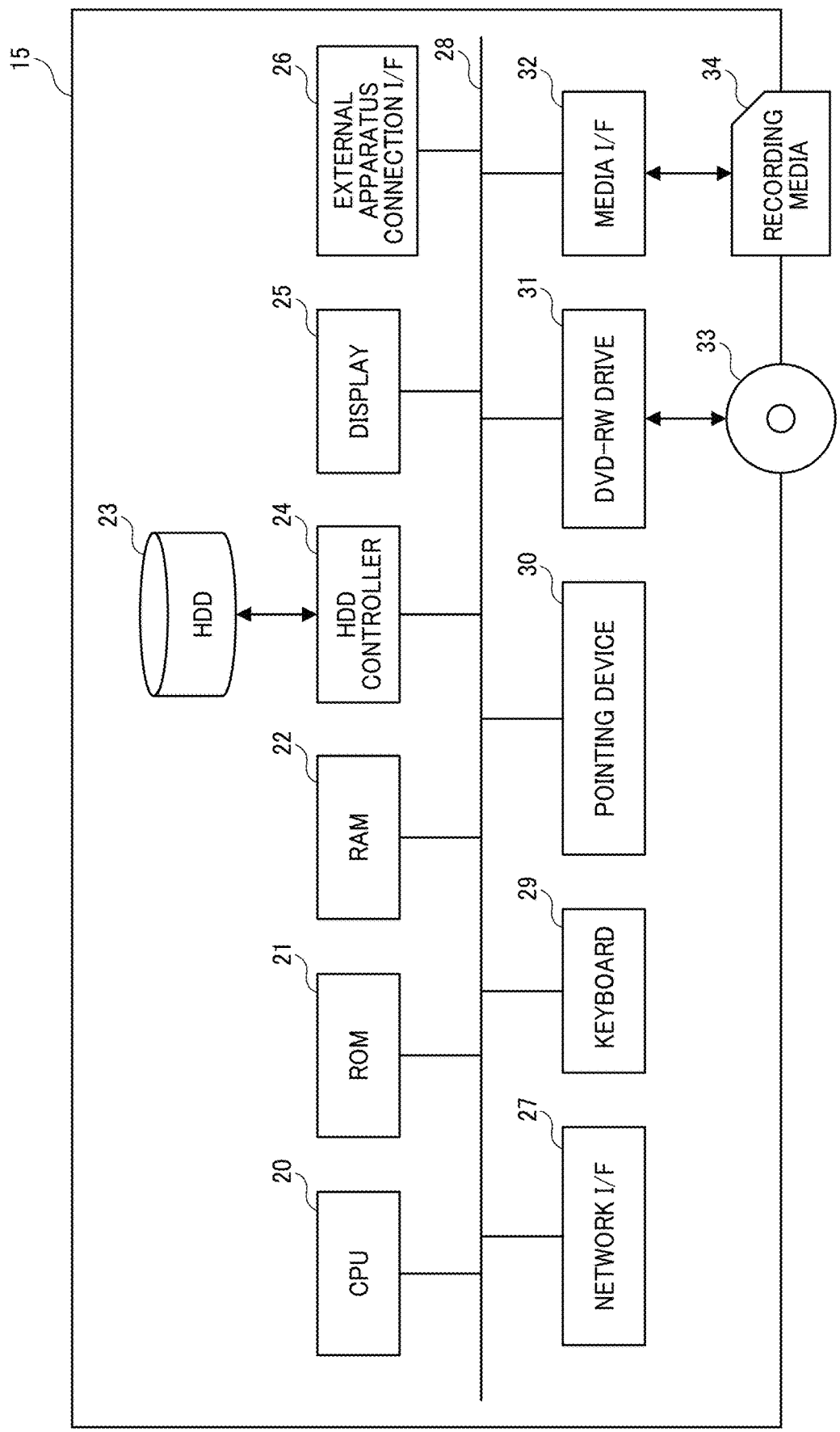
FIG. 13 is a block diagram illustrating an example of a hardware configuration of the management apparatus.

FIG. 13 is a block diagram illustrating an example of a hardware configuration of the management apparatus 15 that extracts a combination of two structures and stores information related to the combination to manage the structures. Similar to a typical computer, the management apparatus 15 includes a central processing unit (CPU) 20, a read only memory (ROM) 21, a random access memory (RAM) 22, a hard disk drive (HDD) 23, and a HDD controller 24. The management apparatus 15 further includes a display 25, an external device connection interface (I/F) 26, a network I/F 27, a data bus 28, a keyboard 29, a pointing device 30, a digital versatile disc rewritable (DVD-RW) drive 31, and a media I/F 32.

The CPU 20 controls the entire operations of the management apparatus 15. The ROM 21 stores a program such as an initial program loader (IPL) to drive the CPU 20. The RAM 22 serves a work area for the CPU 20. The HDD 23 stores various types of data such as programs. The HDD controller 24 controls reading or writing of various types of data from or to the HDD 23 under control of the CPU 20. In the present embodiment, the HDD 23 is used as a storage device that stores various types of data, but the storage device is not limited thereto, and a solid state drive (SSD) or the like may be used.

The display 25 displays various types of information, such as a cursor, a menu, a window, characters, and an image. The external device connection I/F 26 is an interface for connecting to various external devices. Examples of the external device include, but are not limited to, a universal serial bus (USB) memory and a printer. The network I/F 27 is an interface for data communication using a communication network. Examples of the data bus 28 include, but not limited to, an address bus and a data bus that electrically connect the components, such as the CPU 20, to one another.

The keyboard 29 is one example of an input device including multiple keys for inputting characters, numerals, or various instructions. The pointing device 30 is an example of an input device that allows a user to select or execute various instructions, select an item for processing, or move a cursor being displayed. The DVD-RW drive 31 controls reading or writing of various types of data from or to a DVD-RW 33 as an example of a removable recording medium. The removable storage medium is not limited to the DVD-RW and may be a DVD-recordable (DVD-R) or the like. The media I/F 32 controls reading or writing of data from or to a recording medium 34 such as a flash memory.

Figure 14:
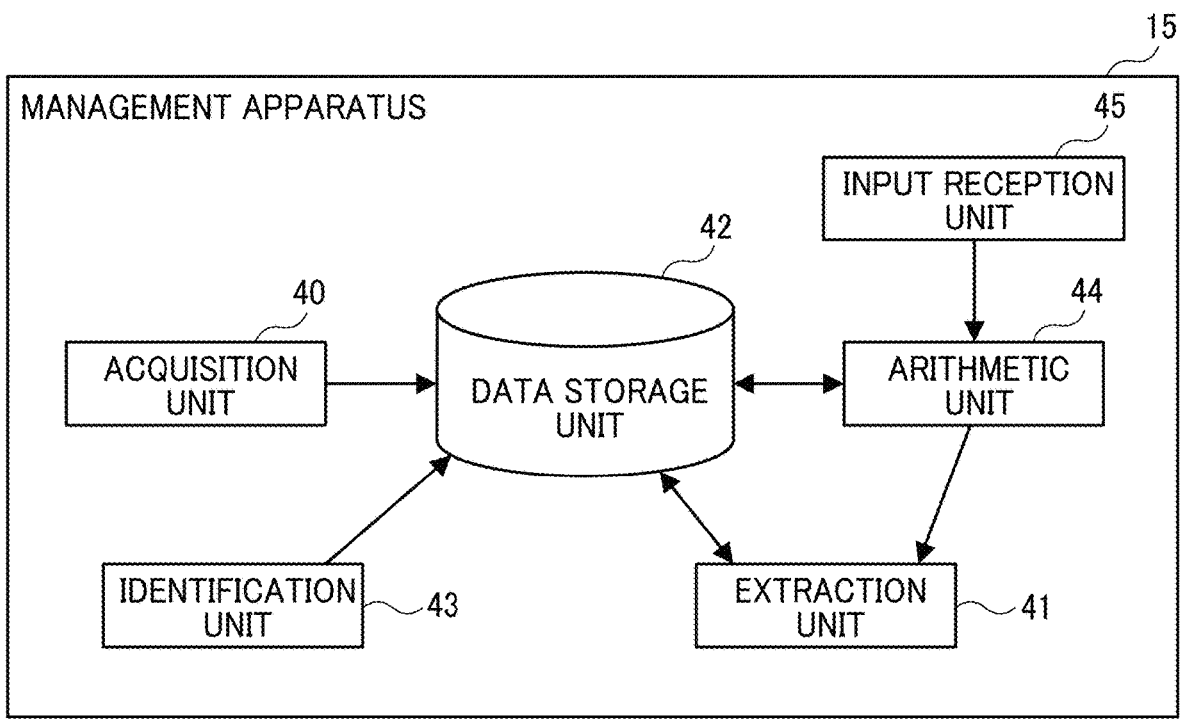
FIG. 14 is a block diagram illustrating an example of a functional configuration of the management apparatus.

FIG. 14 is a block diagram illustrating an example of a functional configuration of the management apparatus 15. The management apparatus 15 includes an acquisition unit 40, an extraction unit 41, a data storage unit 42, an identification unit 43, an arithmetic unit 44, and an input reception unit 45. Each of functions of the above-described units can be implemented by one or more processing circuits or circuitry.

Here, the term "processing circuit or circuitry" includes a programmed processor to execute each function by software, such as a processor implemented by an electronic circuit, and devices, such as an application specific integrated circuit (ASIC), a digital signal processors (DSP), a field programmable gate array (FPGA), and conventional circuit components arranged to perform the recited functions.

The acquisition unit 40 acquires the measurement result of the multiple structures from the measuring apparatus 16 as the shape information of the structure fabricated by the fabrication apparatus 10. The acquisition unit 40 further acquires the measurement result by the measuring apparatus 16 as the shape information of the structure manufactured by other apparatuses. The extraction unit 41 extracts a combination of two or more structures, which satisfies the quality of the product when the two or more structures are combined, from the multiple structures based on the measurement result acquired from the acquisition unit 40.

When the quality of the product is satisfied, in addition to the structure A and the structure B as designed illustrated in FIGS. 12A and 12B, the deformed structure A' and the deformed structure B', and the deformed structure A" and the deformed structure B" illustrated in FIG. 12B, which are to be discarded, can be extracted as a combination of structures.

The measurement result includes information of one or more feature points. When a first structure and a second structure are combined with each other, the extraction unit 41 can determine one or more feature points of the first structure and the second structure, and can extract a combination of the first structure and the second structure satisfying predetermined conditions based on information of one or more feature points included in the measurement result of each of the multiple fabricated first structures and the multiple fabricated second structures.

Either combination of one second structure or another second structure with the first structure may satisfying the predetermined conditions and satisfy the quality of the product. In such a case, one of the one second structure and another second structure (e.g., the one second structure) to be assembled with the first structure into a product having a better quality is selected, and the extraction unit 41 extracts the first structure and the one second structure as a preferable combination. Alternatively, a second structure which is first determined to satisfy the quality of the product may be selected to be combined with the first structure.

The data storage unit 42 stores the measurement result acquired by the acquisition unit 40. In addition to the measurement results for the multiple structures, the data storage unit 42 stores multiple pieces of fastening information in which a measurement result of a fastening structure as a product, a measurement result of a fastening target structure to which the fastening structure is fastened, and a measurement result of strength of fastening are associated with each other.

The identification unit 43 identifies each structure from the start of fabrication by the fabrication apparatus 10 to the completion of degreasing and sintering by the degreasing and sintering apparatus 14 based on an image captured by an imaging device such as a camera. The identification unit 43 further identifies each structure from the start to end of manufacturing by other apparatuses based on an image captured by the imaging device such as a camera.

The identification unit 43 identifies each structure based on a location or arrangement of the structures in each apparatus, or identifies each structure based on identification information assigned to each structure, for example, which is formed on a surface of each structure. The acquisition unit 40 can acquire a measurement result obtained by measuring the structure, which is identified by the identification unit 43, by the measuring apparatus 16 together with identification information for identifying the structure.

The arithmetic unit 44 performs a simulation of fabrication of multiple structures. The data storage unit 42 collects and stores a measurement result obtained by measuring multiple structures, which is fabricated by the fabrication apparatus 10, from which surplus powder has been removed and a measurement result obtained by measuring multiple structures sintered by the degreasing and sintering apparatus 14.

Based on the measurement results collected in the data storage unit 42, the arithmetic unit 44 performs a simulation for estimating the dimensions of the structure after being sintered based on the measurement result after the surplus powder has been removed.

The arithmetic unit 44 determines a fastening structure to be fastened to the fastening target structure based on the multiple pieces of fastening information stored in the data storage unit 42 and an input measurement result of one or more feature points of the fastening portion of the fastening target structure.

The arithmetic unit 44 can also determine the fastening structure based on an input fastening condition between the fastening structure and the fastening target structure in addition to the multiple pieces of fastening information and the measurement result of the fastening portion. The input reception unit 45 receives an input of the fastening condition and the like used for calculation by the arithmetic unit 44.

Figure 15:
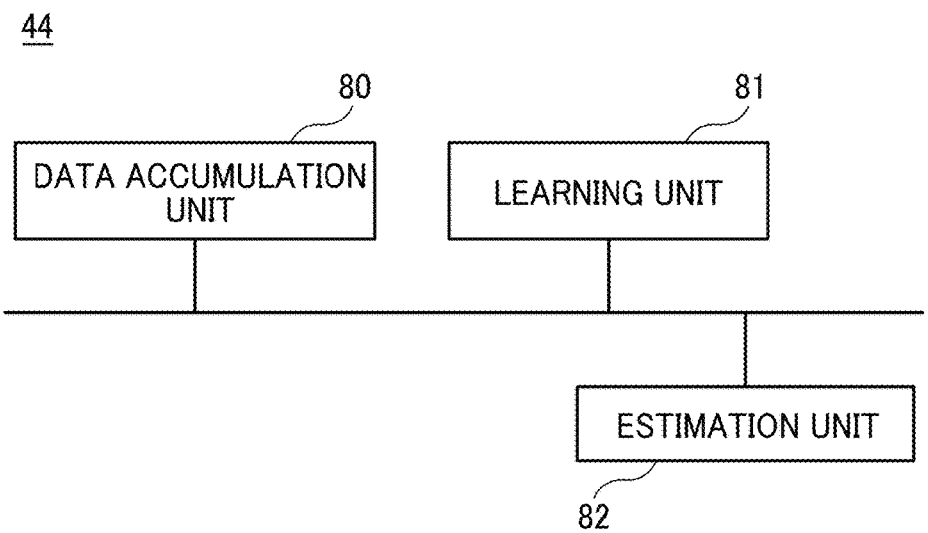
FIG. 15 is a block diagram illustrating an example of a configuration of an arithmetic unit of the management apparatus.

The arithmetic unit 44 may implement a machine learning program. The arithmetic unit 44 performs a preferable simulation by machine learning based on data for fabricating a structure, a measurement result, and the like. As illustrated in FIG. 15, the machine learning program causes the arithmetic unit 44 to function as a data accumulation unit 80, a learning unit 81, and an estimation unit 82.

The data accumulation unit 80 receives and accumulates data for fabricating a structure, a measurement result, and a simulation result as data. The teaming unit 81 extracts a feature amount from the data accumulated in the data accumulation unit 80 and learns the correspondence therebetween. The estimation unit 82 estimates a shape change of the structure based on the result of learning by the learning unit 81, and performs a simulation based on the estimate.

The management apparatus 15 includes at least the extraction unit 41 and can include other units such as the acquisition unit 40 and the data storage unit 42 if desired. The management apparatus 15 may include the determination unit 71 and the quality data processing unit 78.

Figure 16:
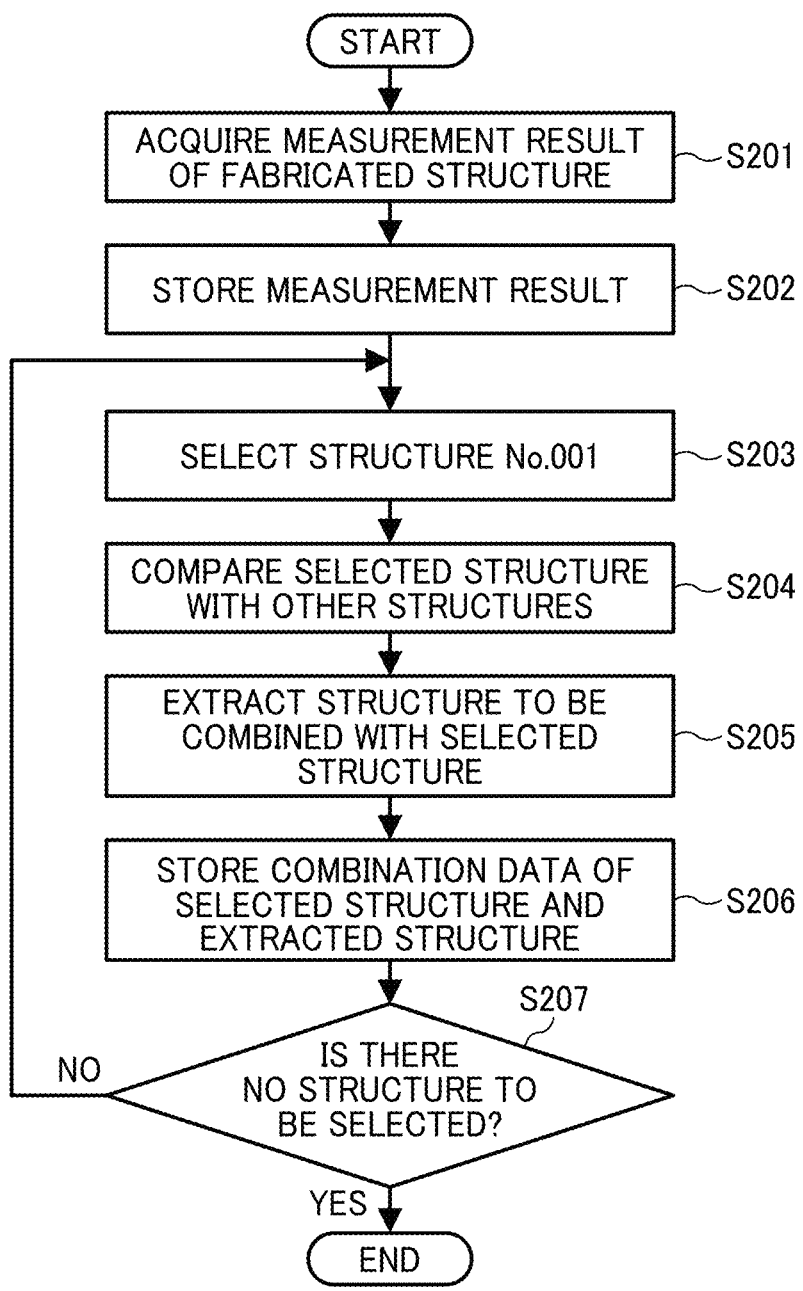
FIG. 16 is a flowchart illustrating an example of a process executed by the management apparatus.

FIG. 16 is a flowchart illustrating an example of a process executed by the management apparatus 15. The management apparatus 15 executes the process after multiple structures of two or more types are fabricated by the fabrication apparatus 10 or the like and before the multiple structures of two or more types are assembled into a product. The multiple structures of two or more types may be fabricated only by the fabrication apparatus 10, or the multiple structures of two or more types may be manufactured by the fabrication apparatus 10 and other apparatuses.

In step S201, the measuring apparatus 16 measures the dimensions of the fabricated structure, and the management apparatus 15 acquires the measurement result from the measuring apparatus 16. In step S202, the management apparatus 15 stores the measurement result.

In step S203, the management apparatus 15 selects one structure. In step S204, the management apparatus 15 compares the measurement result of the selected structure with the measurement results for the other structures. In step S205, the management apparatus 15 extracts a structure to be combined with the selected structure. Thus, the management apparatus 15 extracts a combination of the selected structure and the extracted structure to be assembled.

The management apparatus 15 compares the measurement result of the selected structure with the measurement result of a different type of structure. When the selected structure is within a designated tolerance, the management apparatus 15 extracts another type of structure whose measurement result is within the designated tolerance as a structure to be combined.

When the selected structure is out of the designated tolerance, the management apparatus 15 extracts a structure whose measurement result is out of the designated tolerance, which is the different type from the selected structure, which can be inserted into the selected structure, and which satisfies the predetermined conditions such as an insertion length and an insertion pressure as a structure to be combined.

When the selected structure is a structure to be inserted, the management apparatus extracts a structure into which the selected structure can be inserted and which satisfies the predetermined conditions as a structure to be combined.

In step S206, the management apparatus 15 stores information related to a combination of the selected structure and the extracted structure. Examples of the stored information includes information in which the identification information of the selected structure is associated with the identification information of the extracted structure.

In step S207, the management apparatus 15 determines whether there is no structure to be selected, and if there is still a structure to be selected, the process returns to step S203 to execute the process of extracting a combination. On the other hand, if there is no structure to be selected, the process ends.

Figure 17:
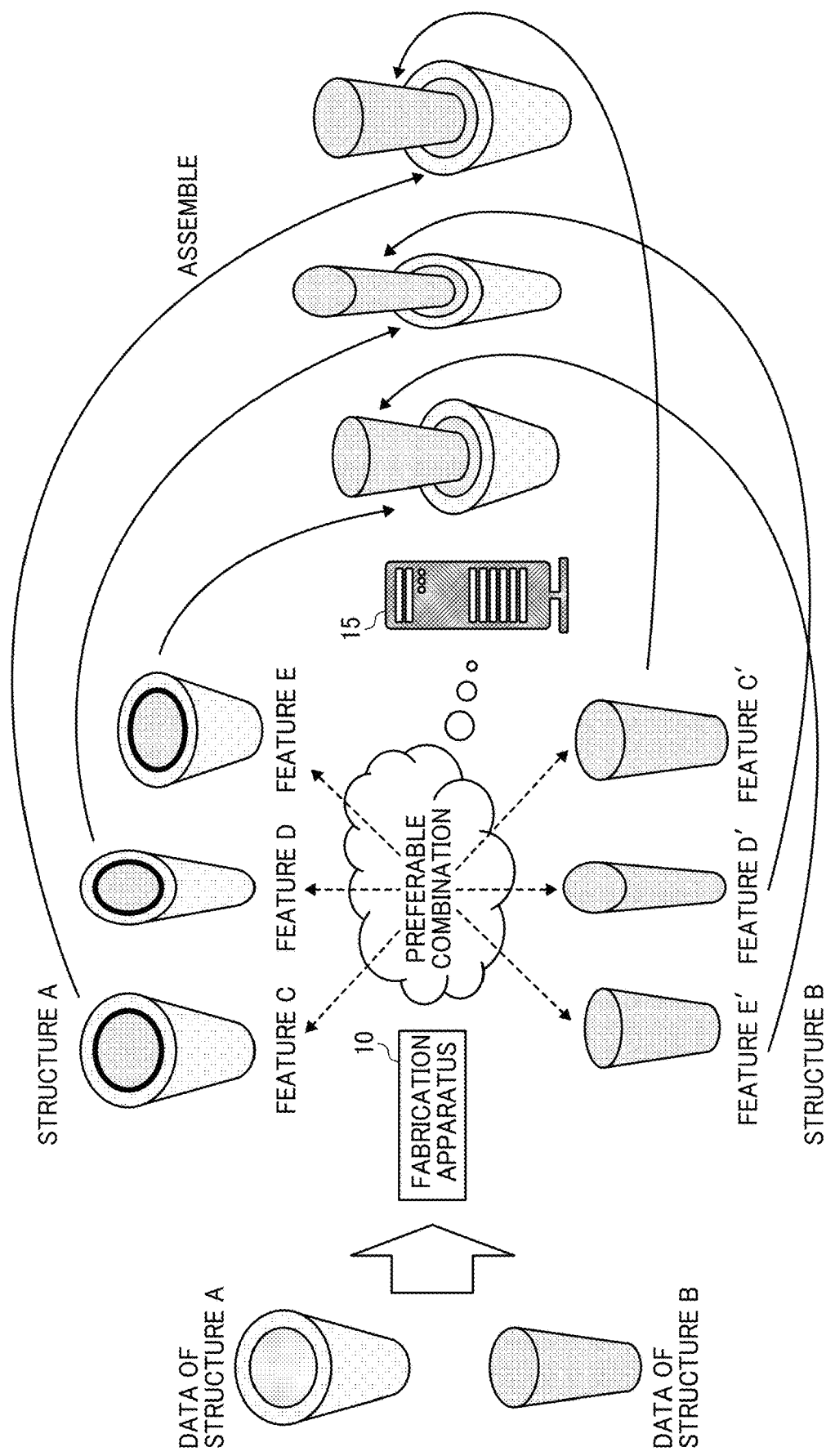
FIG. 17 is a diagram illustrating a first example in which the management apparatus extracts a combination of two structures to manufacture a product based on the extracted combination.

Embodiments of the present disclosure is described in detail below with specific examples. FIG. 17 is a diagram illustrating a first example in which the management apparatus 15 extracts a combination of two structures to manufacture a product based on the extracted combination.

When multiple structures A and multiple structures B to be combined with each other are fabricated in the same production system, as described above, the density of the powder, the permeation of the fabrication liquid, the heat transfer, and the like are different depending on the location in each apparatus, and thus all the structures A and the structures B fabricated do not have the same dimensions.

Thus, as illustrated in FIG. 17, in addition to the structures A and B having features C and C' which have circular cross sections within the tolerance, the structures A and B having features D, D', E, and E' which have oval cross sections out of the tolerance are fabricated.

When a product is assembled by inserting the structure B into the structure A, a structure B suitable for the shape of one structure A is selected from among multiple structures B and inserted into the one structure A, thereby keeping the quality of the assembled product constant.

For example, the structure B having the feature C' is suitable for the shape of the structure A having the feature C, the structure B having the feature D' is suitable for the shape of the structure A having the feature D, and the structure B having the feature E' is suitable for the shape of the structure A having the feature E.

That is, even if the structure A is deformed, a structure B that matches the shape of the deformed structure A is combined with the deformed structure A to manufacture a product having an allowable quality. Thus, deformed structures can be used for manufacturing a product, thereby reducing the number of discarded structures, increasing the yield of the product, and reducing the cost of the product.

A structure fabricated by the 3D printer may be largely deformed in a fabrication step, but the 3D printer to which the present disclosure is applied can attain the above-described effect.

In the example illustrated in FIG. 17, the management apparatus 15 extracts a combination of the structures based on shape information (feature) of each structure. Alternatively, the management apparatus 15 can more appropriately extract a combination of the structures based on the measurement result including the dimension, the shape, and the like of the structures measured in detail in addition to the feature.

Figure 18:
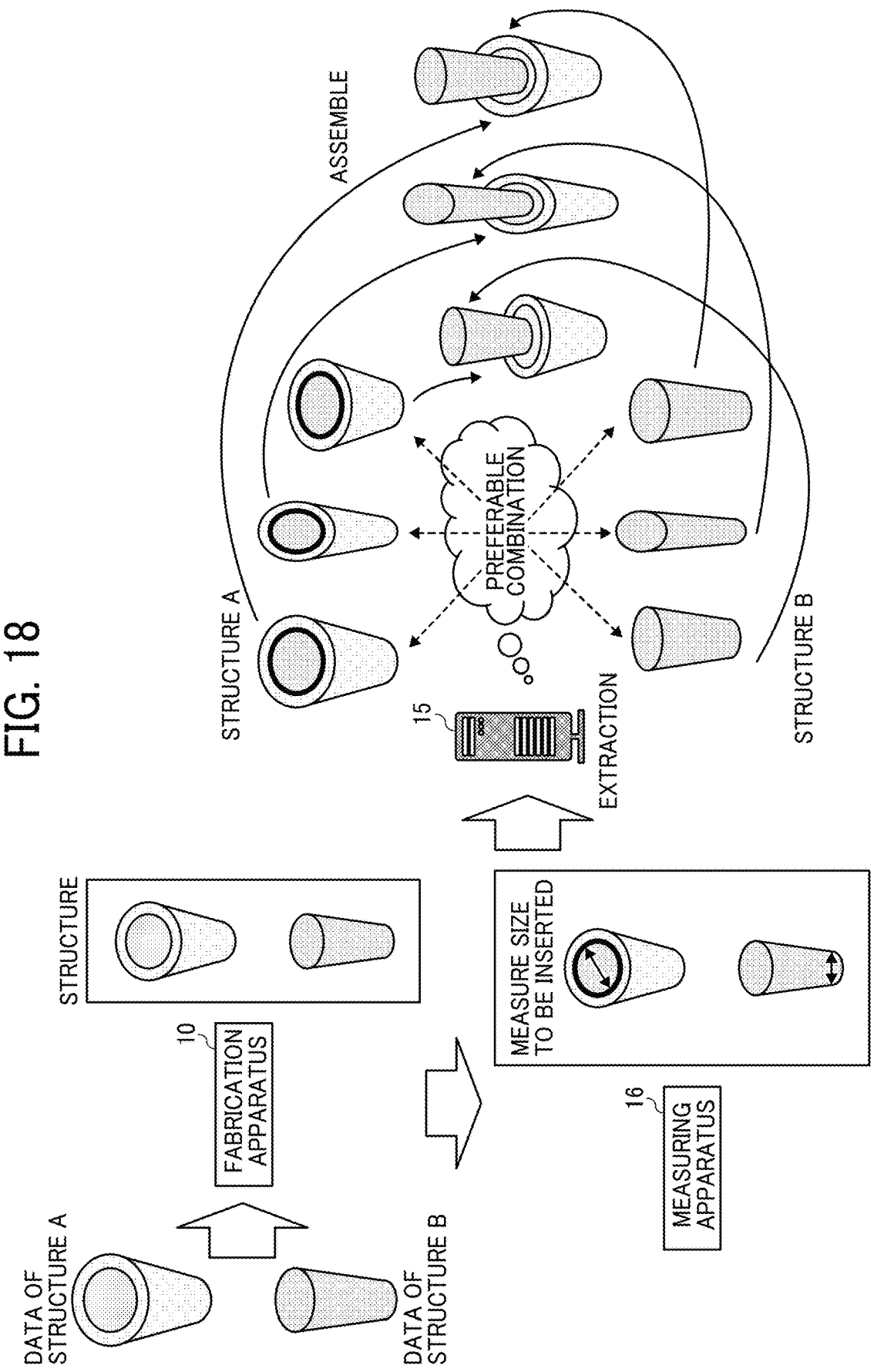
FIG. 18 is a diagram illustrating a second example in which the management apparatus extracts a combination of two structures to manufacture a product based on the extracted combination.

FIG. 18 is a diagram illustrating a second example in which the management apparatus 15 extracts a combination of two structures to manufacture a product based on the extracted combination. In the example illustrated in FIG. 18, the production system includes the measuring apparatus 16 that measures dimensions, shapes, and the like of the structures.

When the structure A and the structure B are assembled into a product, the measuring apparatus 16 measures dimensions, shapes, features, and the like of each fastening portion of the structure A and the structure B in contact with each other, and the management apparatus 15 acquires the measurement results for all the fabricated structures measured by the measuring apparatus 16.

For example, the dimensions of the fastening portion of the structure A includes an inner diameter, a length in a longitudinal direction, and the like, and the shape of the fastening portion of the structure A includes a cylindrical shape or the like. The dimensions of the fastening portion of the structure B includes an outer diameter, a length in a longitudinal direction, and the like, and the shape of the fastening portion of the structure B includes a columnar shape or the like. The feature of the fastening portion includes a shape of the cross section such as a perfect circle or an oval, a surface state such as surface roughness, and the like.

The management apparatus 15 determines whether the structure B can be inserted into the structure A, how long the insertion length of the structure B into the structure A is, whether the insertion pressure is appropriate based on information such as the dimensions of the fastening portion and the shape of the structures A and B in addition to the features such as a perfect circle and an oval in cross section, and determines and extracts which structure B is preferable for one structure A from among the multiple structures B.

The management apparatus 15 can determine whether the structure is preferable based on whether the structure satisfies the predetermined conditions. When there are multiple structures satisfying the predetermined conditions, any one of the multiple structures satisfying the predetermined conditions may be adopted. For example, a structure having better quality when being assembled may be adopted, or a structure first determined to satisfy the predetermined conditions may be adopted.

In the example illustrated in FIG. 18, the management apparatus 15 extracts the combination based on the measurement result by the measuring apparatus 16. Alternatively, the management apparatus 15 may store the measurement results and compares the stored measurement results, thereby easily extracting the combination.

Figure 19:
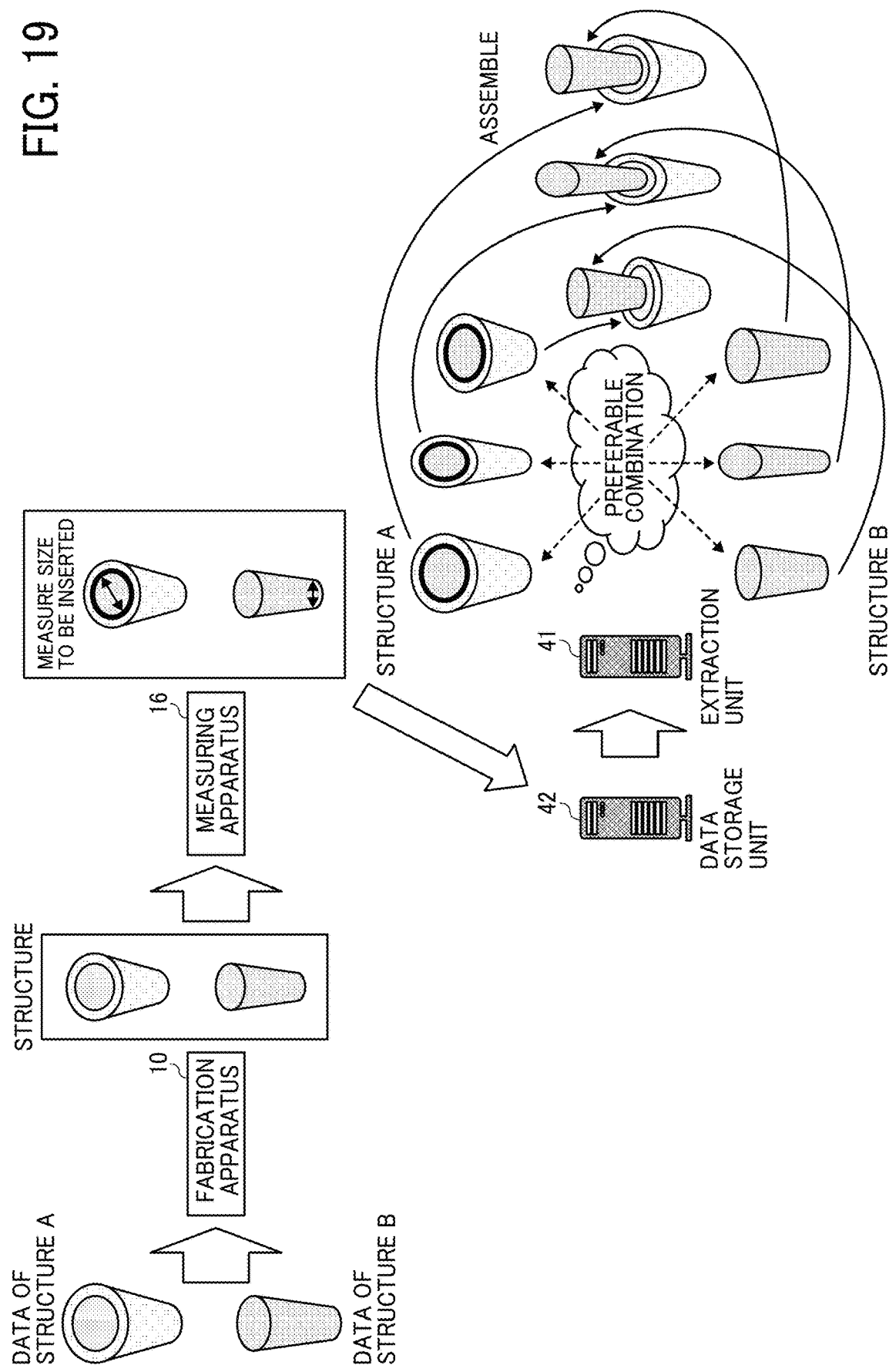
FIG. 19 is a diagram illustrating a third example in which the management apparatus extracts a combination of two structures to manufacture a product based on the extracted combination.

FIG. 19 is a diagram illustrating a third example in which the management apparatus 15 extracts a combination of two structures to manufacture a product based on the extracted combination. In the example illustrated in FIG. 19, the production system includes the data storage unit 42 that stores the measurement results by the measuring apparatus 16, and the management apparatus 15 can access all the measurement results.

The data storage unit 42 may be a non-volatile storage area such as an HDD or an SSD included in the management apparatus 15, a USB memory connected to the management apparatus 15, or a data storage device that functions as a stand-alone device such as a network attached storage (NAS).

The data storage unit 42 stores the measurement results obtained by measuring all the structures A and B, and the extraction unit 41 of the management apparatus 15 extracts an appropriate combination of the structure A and the structure B based on the measurement results stored in the data storage unit 42.

Thus, the extraction unit 41 determines a preferable combination of the structures A and B based on the comparison of the dimensional differences of the fastening portions (i.e., portions in contact with each other when being assembled) of the structures A and B to be combined or the homothetic ratio between the shapes of the structures A and B. Further, the extraction unit 41 may determine a preferable combination for assembly based on the comparison of the surface roughness of the structures A and B.

If the structures A are manufactured, the distribution of the feature points of the structures A is calculated from the measurement result, and the structures B are manufactured so as to match the calculated distribution, remainders of the structures A and B can be reduced, and the structure A and the structure B are efficiently combined with each other. Here, the term "distribution" refers to a statistical distribution, in which the number of the structures is distributed over a certain range of the feature point, for example, the inner diameter of the structure A.

Figure 20:
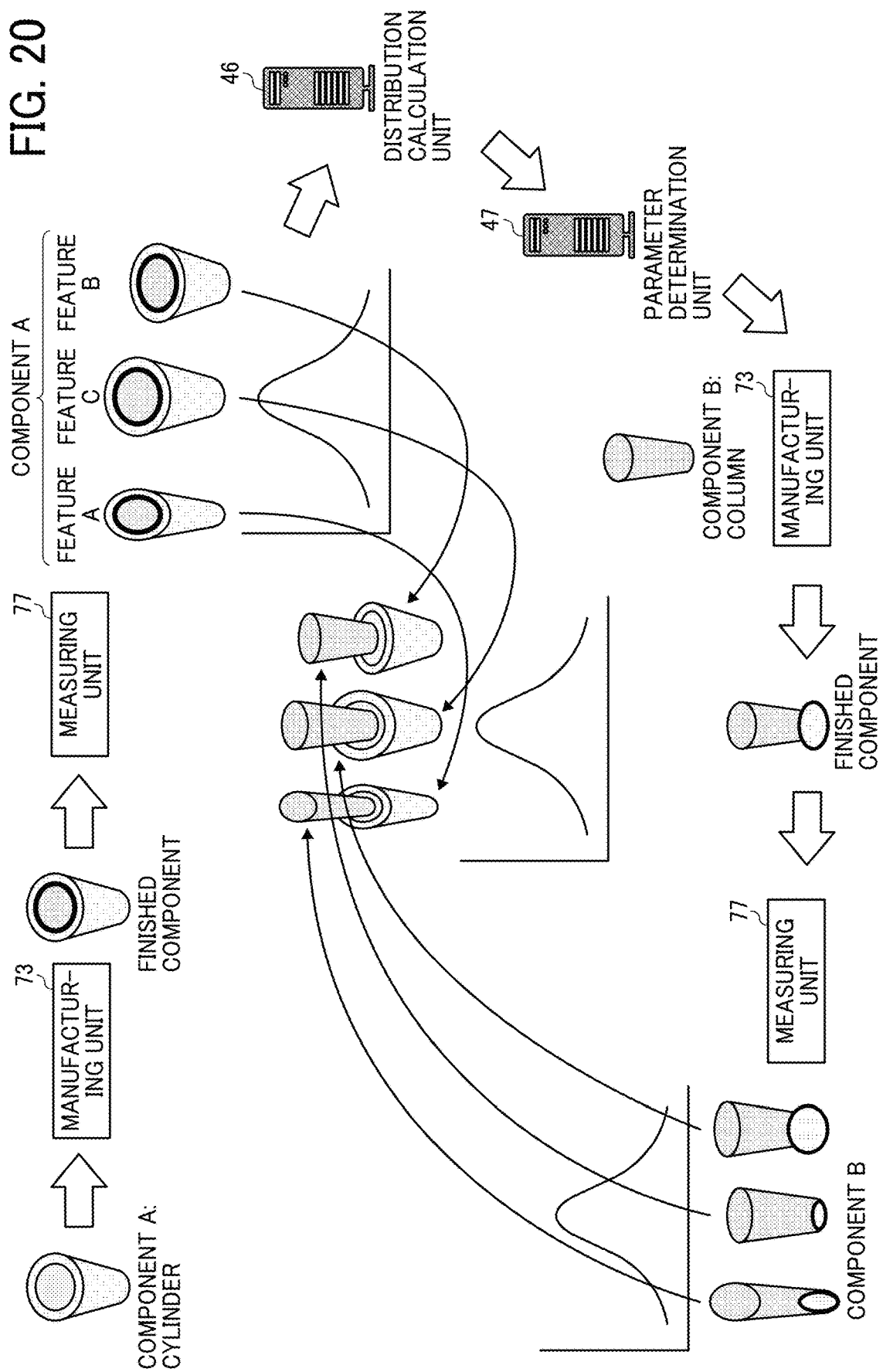
FIG. 20 is a diagram illustrating a process in which the management apparatus optimizes parameters of each apparatus.

FIG. 20 is a diagram illustrating a process in which the management apparatus 15 optimizes (adjusts) the parameters of each apparatus. The manufacturing unit 73 manufactures a finished component of the structure A, and the measuring unit 77 measures the finished component. A distribution calculation unit 46 of the management apparatus 15 calculates the distribution of one or more feature points of the structure A based on the measurement result by the measuring unit 77.

A parameter determination unit 47 of the management apparatus 15 determines (calculates) and optimizes (adjusts)

each parameter such as a fabrication condition, a drying condition, and a sintering condition for manufacturing the structure B so that the distribution of the one or more feature points of the structure B matches the calculated distribution of the structure A. and sets the parameters in each apparatus including the fabrication apparatus 10 constructing the manufacturing unit 73.

The manufacturing unit 73 manufactures the structure B using the set parameters. The measuring unit 77 measures the finished component of the manufactured structure B. At this time, since the distribution of the measurement results of the structure B is close to a distribution that matches the calculated distribution of the structure A, the structure A and the structure B can be efficiently combined with each other, thereby reducing remainders of the structures A and B.

Figure 21:
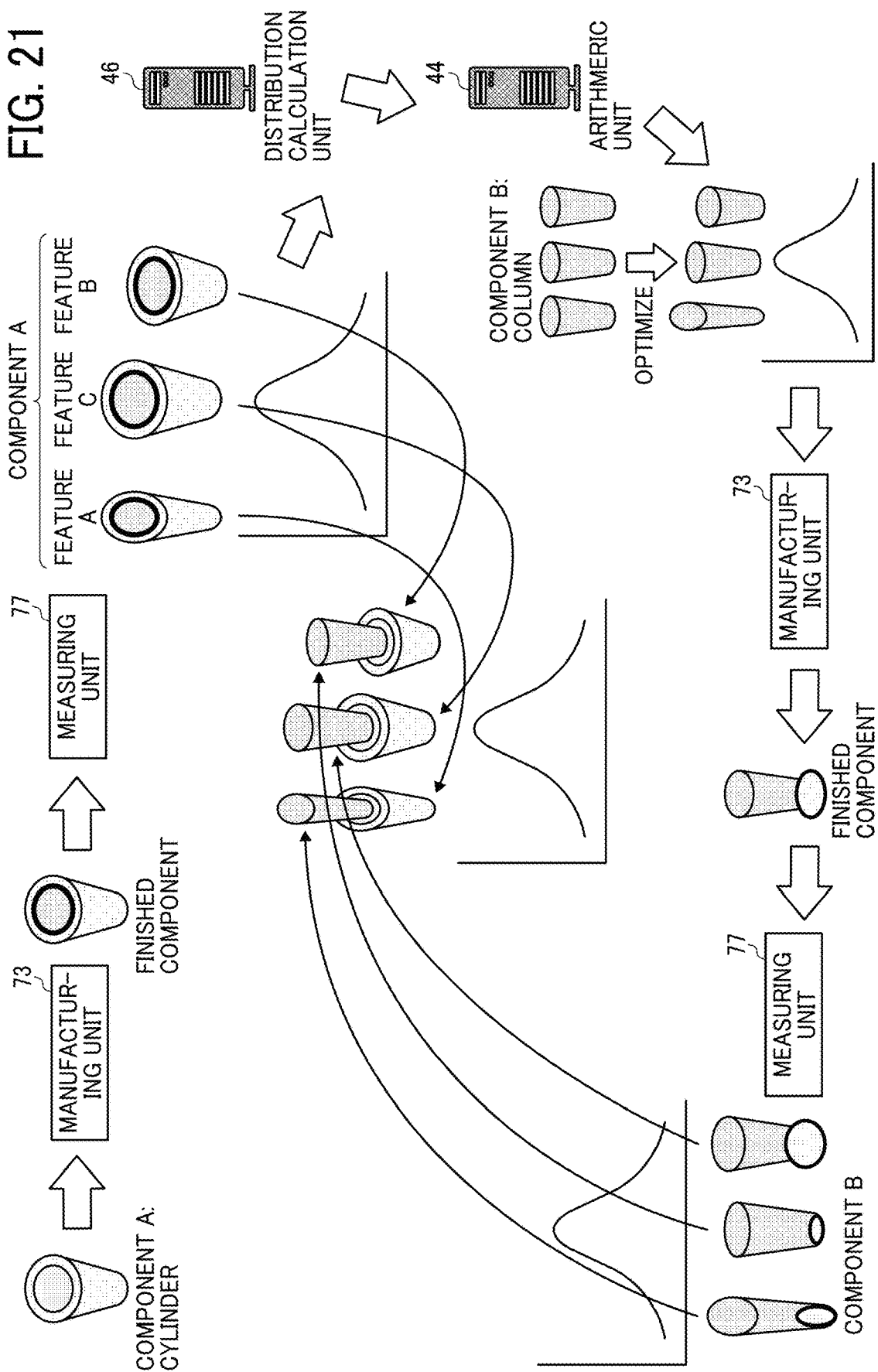
FIG. 21 is a diagram illustrating a process in which the management apparatus optimizes fabrication data.

FIG. 21 is a diagram illustrating a process in which the management apparatus 15 optimizes (corrects) the fabrication data. In the example illustrated in FIG. 20, the parameter determination unit 47 optimizes the parameters of each apparatus, but the structure B having the distribution that matches the calculated distribution of the structure A can also be manufactured by correcting fabrication data.

After the distribution calculation unit 46 calculates the distribution of the structure A, the arithmetic unit 44 corrects and optimizes the fabrication data used to manufacture the structure B so that the distribution of the one or more feature points of the structure B matches the calculated distribution of the structure A.

The arithmetic unit 44 can optimize the fabrication data using a machine learning program that causes the arithmetic unit 44 to function as each unit illustrated in FIG. 15. This is one of examples, and the method of optimizing the fabrication data is not limited to the method using the machine learning program.

The manufacturing unit 73 manufactures the structure B using the optimized fabrication data. The measuring unit 77 measures the finished component of the manufactured structure B. At this time, since the distribution of the measurement results of the structure B is close to a distribution that matches the calculated distribution of the structure A, the structure A and the structure B can be efficiently combined with each other, thereby reducing remainders of the structures A and B.

In the examples illustrated in FIGS. 20 and 21, the distribution is calculated using the measurement result of the structure A which has been sintered. When the correlation between deformations before and after sintering is sufficiently known, the distribution may be estimated using a measurement result of the fabricated structure A from which the surplus powder has been removed before being sintered, instead of the measurement result of the sintered structure A. That is, the distribution calculation unit 46 can calculate the distribution of the one or more feature points of the multiple structures A using information of the one or more feature points of the multiple structures A included in at least one of the measurement result of the multiple structures A fabricated by the fabrication apparatus 10 or the measurement result of the multiple structures A sintered by the degreasing and sintering apparatus 14.

Figure 22:
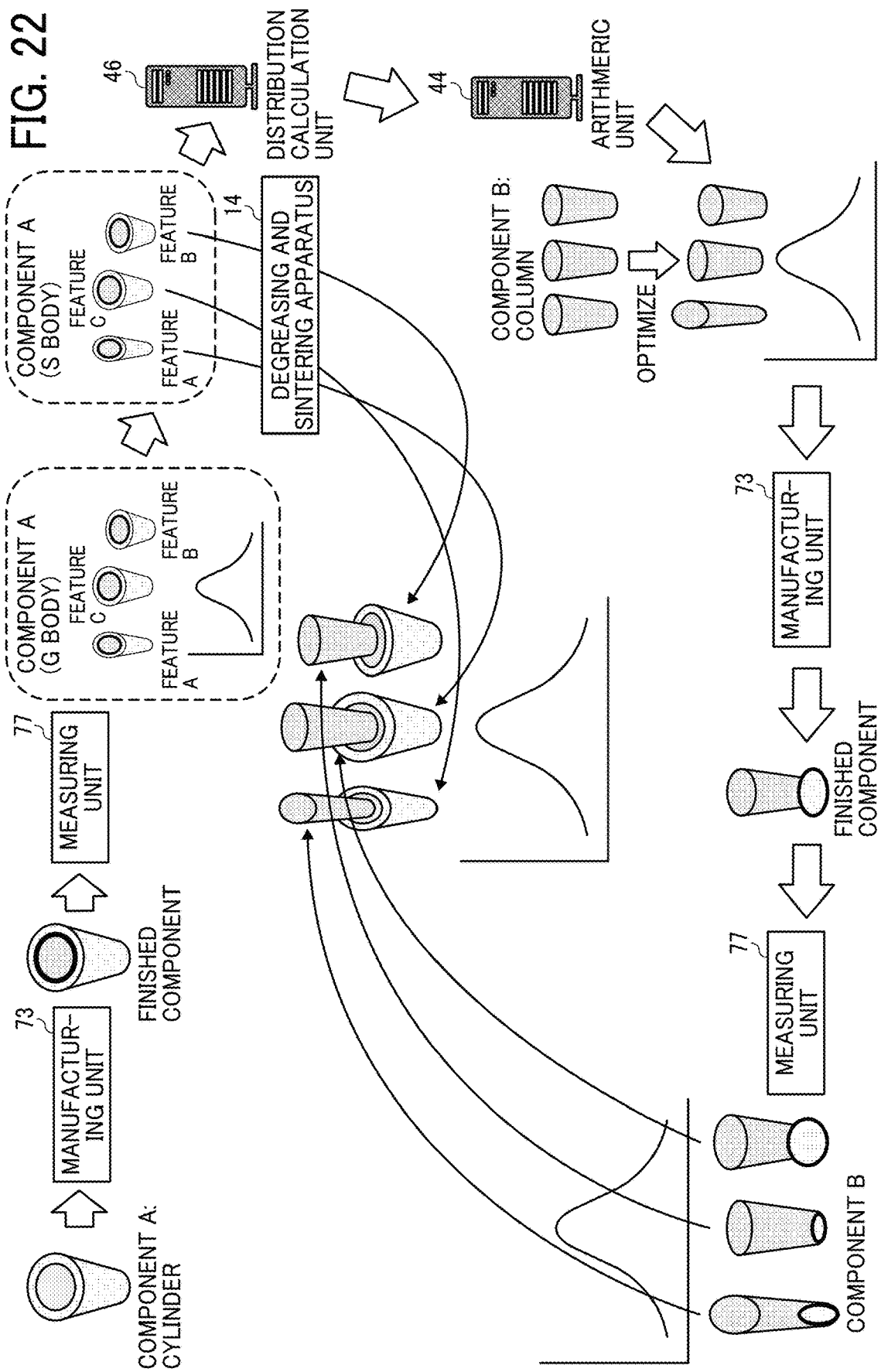
FIG. 22 is a diagram illustrating a process in which the management apparatus optimizes the fabrication data based on measurement results before and after sintering.

In FIG. 22, the distribution calculation unit 46 estimates the distribution of the structure A using the measurement result of the fabricated structure A from which the surplus powder has been removed, and the arithmetic unit 44 corrects the fabrication data of the structure B so as to match the calculated distribution of the structure A while the structure A is sintered.

Also in this case, the arithmetic unit 44 can optimize the fabrication data using a machine learning program that causes the arithmetic unit 44 to function as each unit illustrated in FIG. 15, but the method of optimizing the fabrication data is not limited to the method using the machine learning program.

As described above, since the arithmetic unit 44 corrects the fabrication data while the structure A is sintered, the manufacturing unit 73 can start manufacturing the structure B earlier. Accordingly, the time to manufacture the structure B can be efficiently saved, and the structure A and the structure B can be efficiently combined with each other, thereby reducing remainders of the structures A and B.

After the structures A and B are manufactured, the individual structures A and B to be combined are identified from among multiple structures A and B to extract a combination of the structures A and B.

Figure 23:
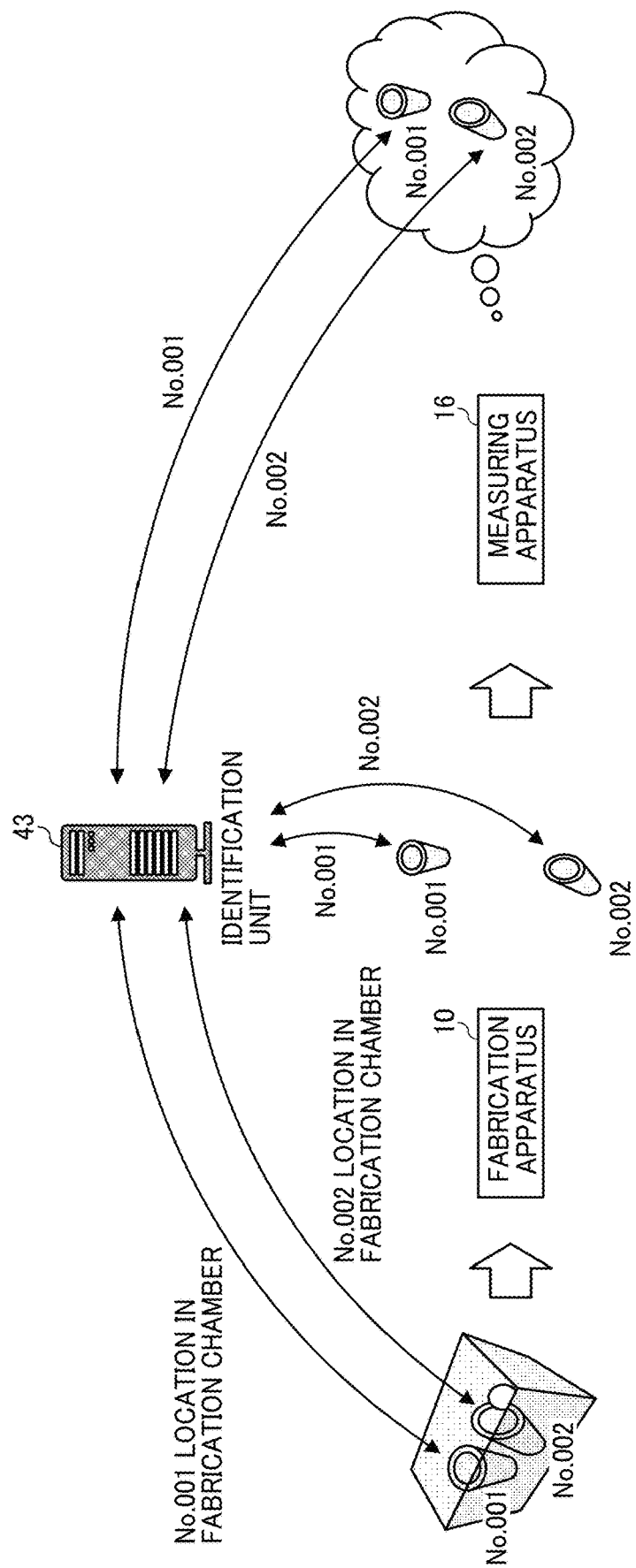
FIG. 23 is a diagram illustrating a fourth example in which the management apparatus extracts a combination of two structures to manufacture a product based on the extracted combination.

FIG. 23 is a diagram illustrating a fourth example in which the management apparatus 15 extracts a combination of two structures to manufacture a product based on the extracted combination. In the example illustrated in FIG. 23, the identification unit 43 monitors each structure and the location of each structure from the start of fabrication to the end of fabrication to identify each structure. Thus, each structure can be associated with the measurement result.

A camera as an imaging device is attached to the fabrication apparatus 10 or the like, and the identification unit 43 identifies each structure based on an image or a video captured by the camera. In order to identify each structure, identification information (identification code data) is added into data of each structure before fabrication. The identification information appears on the surface of each structure after the fabrication, thereby uniquely identifying each structure.

The method of identifying each structure is not limited to the above example, and a label or the like on which an identification code is printed may be attached to each structure in association with the location of each structure in the apparatus at the end of fabrication, thereby uniquely identifying each structure.

In the example illustrated in FIG. 23, the identification unit 43 monitors each structure until the end of fabrication, but when degreasing and sintering are performed after the end of fabrication, the identification unit 43 may monitor each structure until after the degreasing and sintering.

Figure 24:
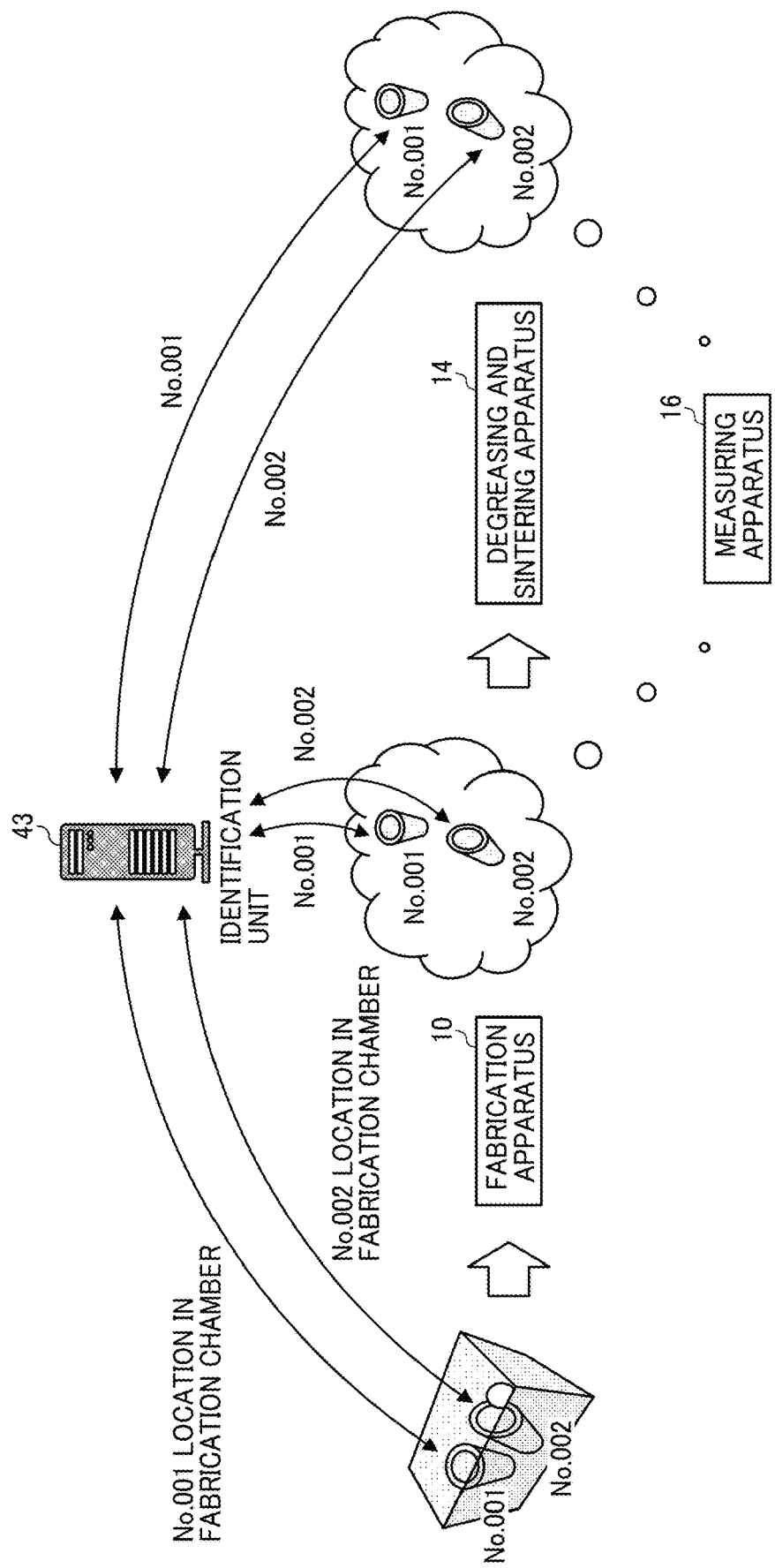
FIG. 24 is a diagram illustrating a fifth example in which the management apparatus extracts a combination of two structures to manufacture a product based on the extracted combination.

FIG. 24 is a diagram illustrating a fifth example in which the management apparatus 15 extracts a combination of two structures to manufacture a product based on the extracted combination.

In the example illustrated in FIG. 24, the identification unit 43 also monitors each structure inside the degreasing and sintering apparatus 14 with the camera. Accordingly, each structure is measured after fabrication, is degreased and sintered by the degreasing and sintering apparatus 14 while being identified by the identification unit 43, and is measured after being sintered. As a result, each structure can be associated with the measurement result after sintering, in addition to the measurement result after fabrication.

When a label on which the identification code is printed is attached to each structure to identify each structure, the label may be burned out by degreasing and sintering.

In this example, the identification unit 43 records the location of each structure in the degreasing and sintering apparatus 14 in association with the identification code printed on the label before the structure is put into the degreasing and sintering apparatus 14. After the structure is sintered, the label on which the identification code is printed can be attached to the structure in association with the structure at each location.

Accordingly, the management apparatus 15 can grasp the qualities of all the structures based on the measurement results from the start of fabrication to the end of sintering.

Figure 25:
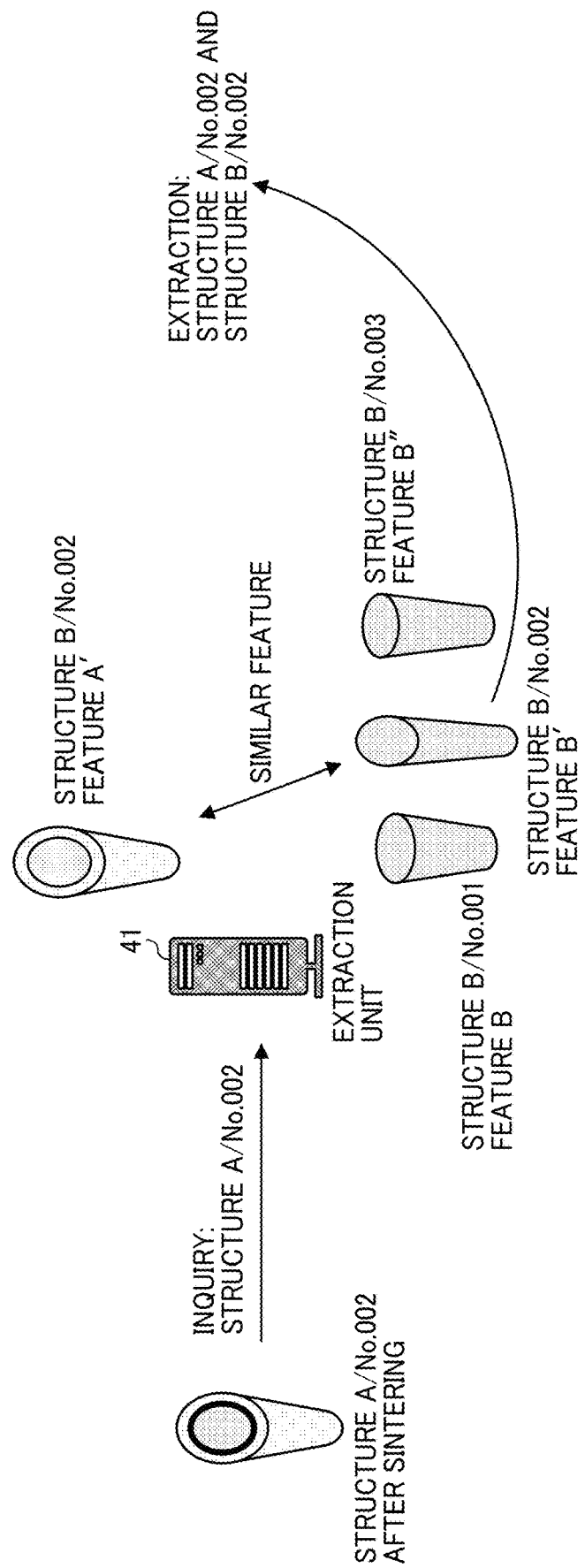
FIG. 25 is a diagram illustrating a first method of extracting a combination of two structures.

Next, a method of extracting a combination of two structures is described in detail. FIG. 25 is a diagram illustrating a first method of extracting a combination of two structures.

The extraction unit 41 compares data of one or more feature points in the measurement result of the sintered first structure with the data of one or more feature points in the measurement result of the sintered second structure among the measurement results acquired from the measuring apparatus 16, and extracts a preferable combination for assembly.

As illustrated in FIG. 25, when the lower portion of the structure B is inserted into the structure A from above to assemble the structure A and the structure B into a product, the measuring apparatus 16 measures the dimensions of the inner shape of the cylindrical upper portion of the structure A into which the structure B is inserted as a feature point of the structure A, and measures the dimensions of the outer shape of the columnar lower portion of the structure B to be inserted into the structure A as a feature point of the structure B.

The measurement result may be stored in the data storage unit 42, and the extraction unit 41 compares the stored data of the feature points of the structures A and B with each other to extract a preferable combination for assembly, thereby reducing the disposal of structures and assembling the structures into a product having the allowable quality.

The result of the combination of the two structures can be output as a report as illustrated in FIG. 26. The report can be printed out using, for example, a printing device serving as an output device. Note that the report may be output on paper, displayed on the display unit, or projected on a wall or a screen. In these cases, a display device, a projection device, or the like can be used as the output device to output the information related the two or more structures. With this report, the management apparatus 15 can indicate the result of the combination and the quality of a product to a user without bothering a person in charge of quality control.

In the example illustrated in FIG. 25, the extraction unit 41 extracts a preferable combination using the measurement result after sintering. Alternatively, the extraction unit 41 may also acquire the measurement result after fabrication and before degreasing and sintering, and associate the measurement result after fabrication with the measurement result after sintering, thereby extracting the preferable combination based on the measurement result after fabrication without the measurement result after sintering.

Figure 27:
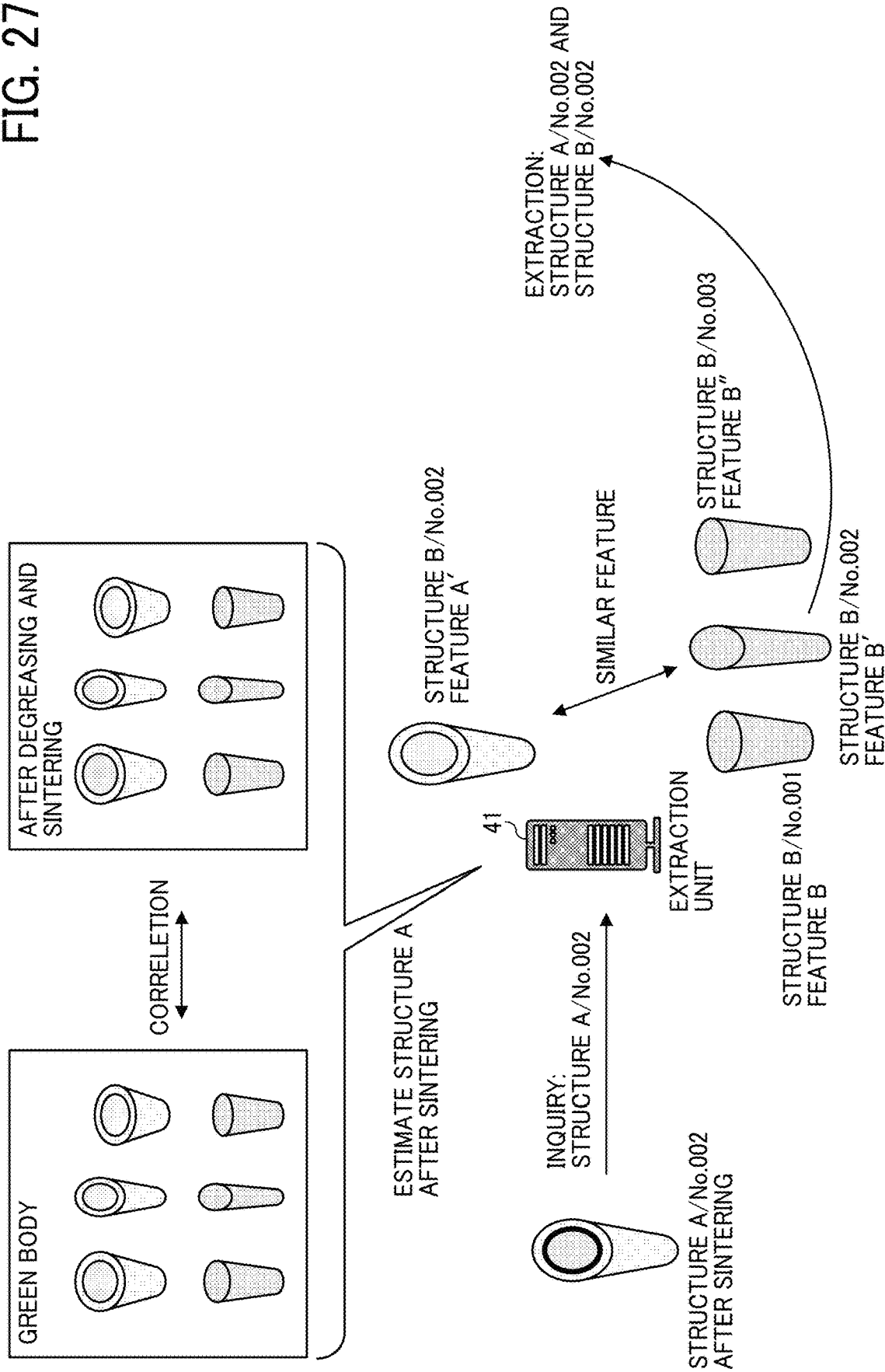
FIG. 27 is a diagram illustrating a second method of extracting a combination of two structures.

FIG. 27 is a diagram illustrating a second method of extracting a combination of two structures. In FIG. 27, in addition to the measurement result obtained by measuring one or more feature points of the structure sintered by the degreasing and sintering apparatus 14, the extraction unit 41 acquires the measurement result obtained by measuring one or more feature points of the structure after fabrication and before degreasing and sintering.

As a result, the extraction unit 41 can acquire a correlation between the measurement result after fabrication and the measurement result after sintering. That is, the extraction unit 41 can determine how the measurement result after sintering changes if the measurement result after fabrication changes, thereby estimating the shape of the structure after sintering from the shape of the structure after fabrication.

Accordingly, the extraction unit 41 can determine which structures are to be combined for a preferable combination based on the measurement result after fabrication. As a result, the structures to be combined are preferentially put into the degreasing and sintering apparatus 14, thereby efficiently manufacturing the structure.

In FIG. 27, the extraction unit 41 only acquire the correlation between the measurement results before and after degreasing and sintering, and thus the extraction unit 41 does not estimate the measurement result after degreasing and sintering without the measurement result before degreasing and sintering.

However, if the measurement results are collected in association with the data, the fabrication conditions, the drying conditions, and the fabrication location, an estimation formula or the like for estimating the measurement result after sintering can be defined. As a result, a simulation can be performed with the data for fabrication, the fabrication conditions, and the like, thereby estimating data of the structure after fabrication and data of the structure after sintering. Accordingly, the extraction unit 41 can extract a preferable combination before fabrication, thereby facilitating the manufacturing plan of the structure in consideration of the assembly.

Figure 28:
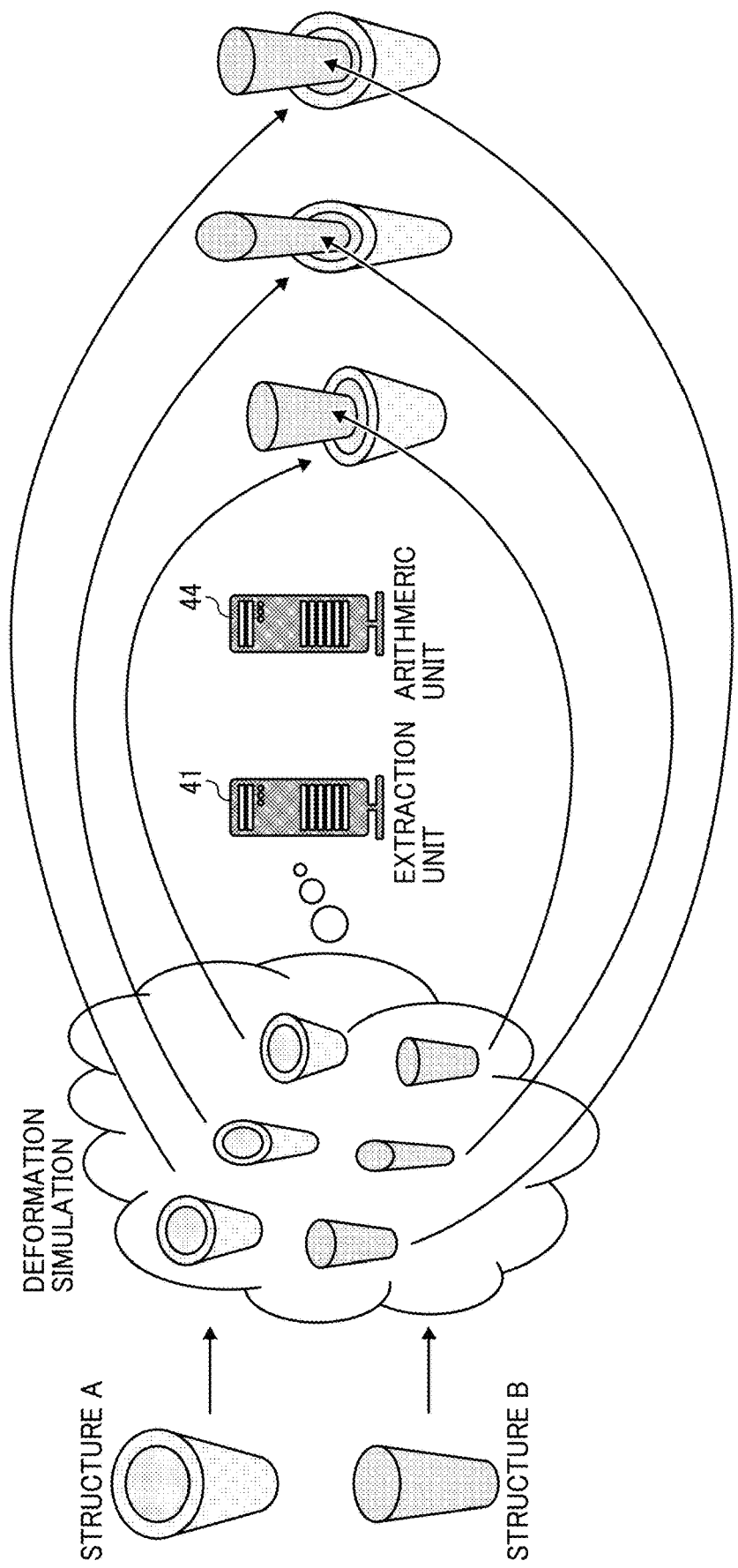
FIG. 28 is a diagram illustrating a third method of extracting a combination of two structures.

FIG. 28 is a diagram illustrating a third method of extracting a combination of two structures. In the example illustrated in FIG. 28, the arithmetic unit 44 performs a simulation to estimate the deformation of the structure A, performs a simulation to estimate the deformation of the structure B. and performs a simulation of the combination of the structure A and the structure B using the respective simulation results. The extraction unit 41 extracts a preferable combination based on the simulation result of the combination.

The arithmetic unit 44 performs, for example, a structure simulation, a sintering simulation, or the like to estimate the deformations of the structures A and B. The arithmetic unit 44 may perform any one of the simulations or the multiple simulations in combination. The arithmetic unit 44 can perform the simulation with an estimation model such as the estimation formula created based on the measurement result acquired in advance.

In the combination simulation of the structure A and the structure B, the insertion length, the insertion pressure, and the like are simulated for a case in which the structure B is not insertable into the structure A, a case in which the structures A and B is not assembled into a product due to a gap, and the like to extract a combination satisfying the predetermined conditions such as an allowable insertion length, an allowable insertion pressure, and the like.

Since the structure is deformed during fabrication, degreasing, sintering, and the like, the dimensions of the structure are measured and collected after each step to create the estimation model to be used for simulation based on the collected multiple measurement results. The estimation model can be modified each time a measurement result is collected to improve the accuracy of the simulation.

The estimation model can be created for a deformation simulation from fabrication to sintering, and a model to be used for the combination simulation can be created based on the created estimation model of the deformation simulation. In the combination simulation, the models of the structures A and B are combined to determine whether the combination of the models satisfies the predetermined conditions. Each model can be continuously updated after being created, thereby continuously improving the accuracy of simulation.

In addition, since the arithmetic unit 44 can accurately estimate the shape of the structure to be fabricated by simulation before the structure is actually fabricated, the extraction unit 41 can accurately extract a preferable combination of the structures.

In the above embodiment, the management apparatus 15 extracts a preferable combination of two or more structures, stores and manages information related to the combination, and combines the two or more structures based on the managed information to manufacture a product. Examples of the manufactured product include a fastening structure, such as a blind rivet or a spring-loaded screw, to be fastened to a plate or the like as a fastening target structure to which the fastening structure is fastened.

When the fastening structure is fastened to the fastening target structure, the fastening structure is inserted into a hole in the fastening target structure and fastened to the fastening target structure. For example, when a screw is fastened to a plate, the screw is inserted into the plate at right angle to the surface of the plate to fasten the screw with a predetermined fastening force.

However, if the screw is inserted obliquely with respect to the surface of the plate, the predetermined fastening force is not obtained. Further, the hole in the plate may not be formed at right angle to the surface of the plate, and may be formed obliquely. Also in this case, the predetermined fastening force is not obtained.

In view of this, the fastening structure includes a fastening portion having a lattice structure (i.e., a lattice structure portion). The fastening structure as the first structure contacts the fastening target structure as the second structure at the fastening portion when the fastening structure is fastened to the fastening target structure. Thus, the fastening portion is likely to follow the shape of the fastening target structure but does not deform excessively. As a result, the fastening structure is fastened to the fastening target structure with sufficient fastening strength.

The lattice structure, in other words, a grating structure is employed to enhance strength and reduce weight of the structure, for example, when a metal product is manufactured by the 3D printer. A structure having a complex shape, such as the lattice structure, can be fabricated by the 3D printer and is referred to as a Design for Additive Manufacturing (DfAM) shape.

In order to fasten the fastening structure to the fastening target structure with a predetermined fastening strength, the fastening structure has the DfAM shape which is suitable for the fastening conditions such as the feature point and the strength of a fastening portion of the fastening target structure.

Figure 29:
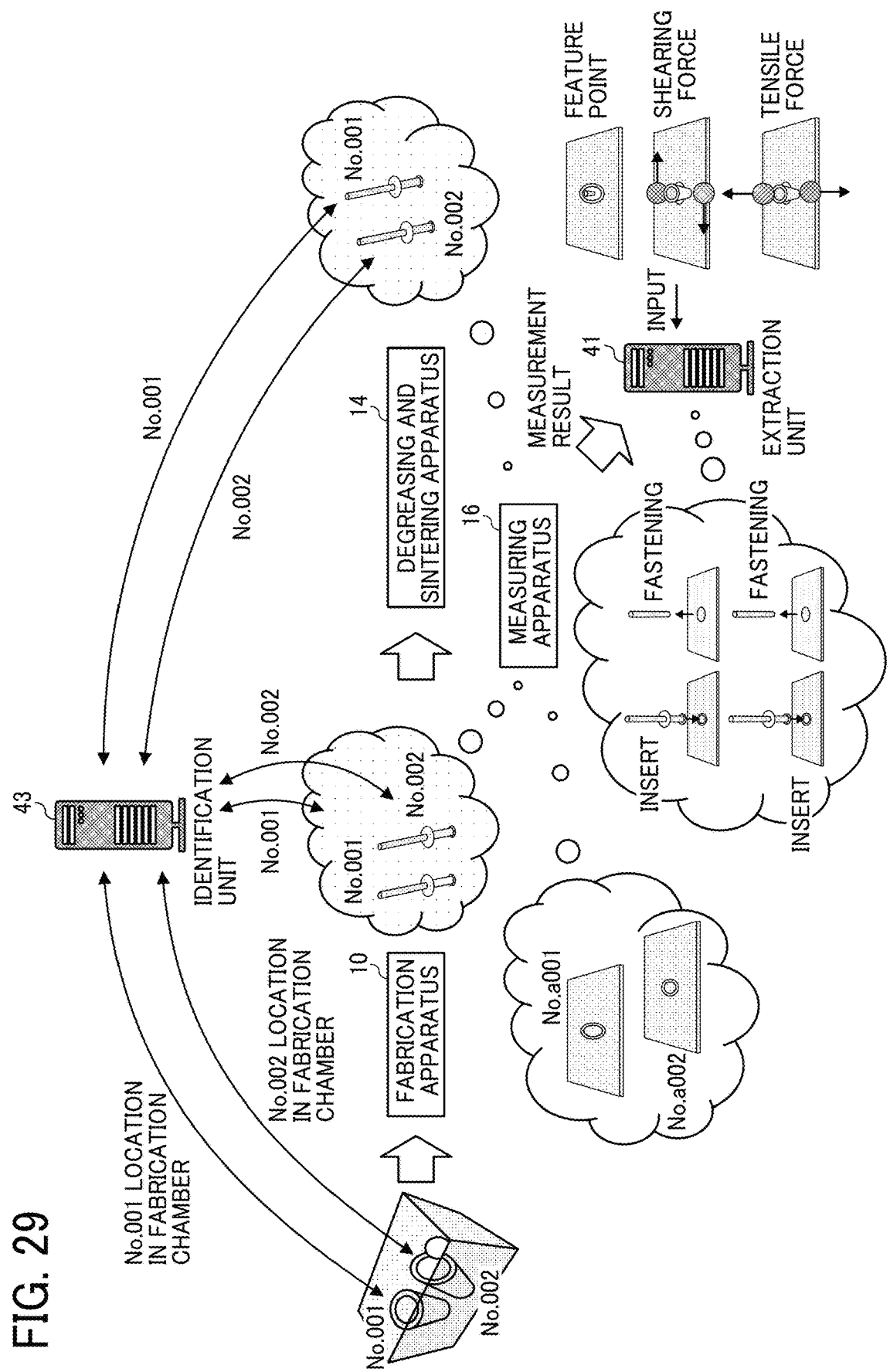
FIG. 29 is a diagram illustrating a first method of determining a product to be manufactured as a fastening structure having a lattice structure in a fastening portion in accordance with a fastening target structure according to an embodiment of the present disclosure.

FIG. 29 is a diagram illustrating a first method of determining a product to be manufactured as the fastening structure having the lattice structure in the fastening portion in accordance with the fastening target structure.

In the production system, the fastening structure having the DfAM shape in the fastening portion is manufactured. The measuring apparatus 16 measures the feature point of the fastening structure and the feature point of the fastening portion of the fastening target structure. Further, the measuring apparatus 16 measures the fastening strength as fastening data after the fastening structure is fastened to the fastening target structure.

The multiple fastening structures having different shapes are fastened to the multiple fastening target structure having different shapes, and the measuring apparatus 16 measures the fastening strength therebetween to acquire the multiple pieces of fastening data. Examples of the fastening data include data such as the feature point of the fastening portion, a force for fastening, the shearing force, and the tensile force.

The extraction unit 41 determines the shape of the fastening structure suitable for being fastened to the fastening target structure based on the fastening conditions such as the feature point and the strength of the fastening portion of the fastening target structure. The determined shape of the fastening structure is used to create data for fabricating each structure constructing the fastening structure in order to manufacture the fastening structure having such a shape.

The measuring apparatus 16 measures the fastening structure having the DfAM shape in the fastening portion, for example, dimensions and shapes of the feature point, such as an outer diameter, a length, and roundness thereof. The measuring apparatus 16 measures the fastening target structure to which the fastening structure is fastened, for example, dimensions and shapes of the feature point, such as a plate thickness and a hole shape thereof.

After the measuring apparatus 16 measures the fastening structure and the fastening target structure, the fastening structure is fastened to the fastening target structure, and the measuring apparatus 16 measures the fastening quality such as the force for fastening, the shearing force after fastening, and the tensile force after fastening.

By repeating such measurement and fastening, the correlation between the feature points and the fastening quality of the fastening structure and the fastening target structure can be acquired.

This correlation is stored in the data storage unit 42 together with data for fabricating the fastening structure. The extraction unit 41 can extract the fastening structure suitable for the fastening target structure based on the stored correlation by inputting the fastening conditions (fastening quality) for fastening the fastening structure to the fastening target structure.

As a result, even if the fastening portion of the fastening target structure has an irregular shape, for example, the fastening portion is deformed in not a perfect circle, a fastening structure suitable for the fastening target structure having the irregular shape can be manufactured without discarding the fastening target structure.

Figure 30A:
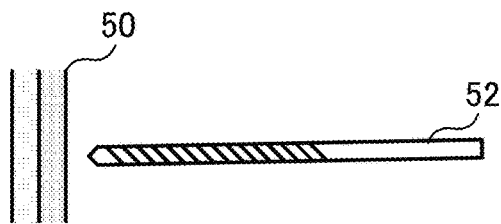
FIGS. 30A to 30E are schematic views of a blind rivet as an example of the fastening structure.
Figure 30B:
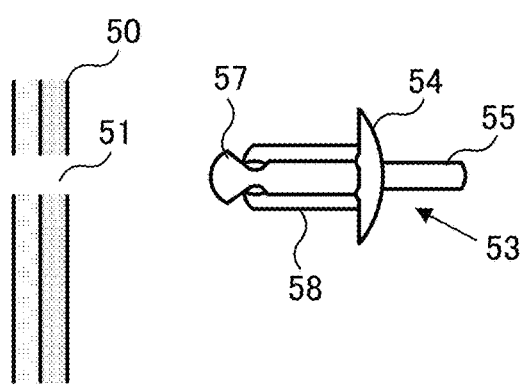

The blind rivet which is an example of the fastening structure is described below with reference to FIGS. 30A to 30E. As illustrated in FIGS. 30A and 30B, a hole 51 is formed in a metal plate 50 to which a rivet 53 as the blind rivet is fastened with a drill 52. The measuring apparatus 16 measures the size of the formed hole 51 and the thickness of the metal plate 50. The management apparatus 15 determines the diameter and length of the rivet 53 based on the size of the hole 51 and the thickness of the metal plate 50. The rivet 53 includes a flange 54 and a shaft 55.

Figure 30C:
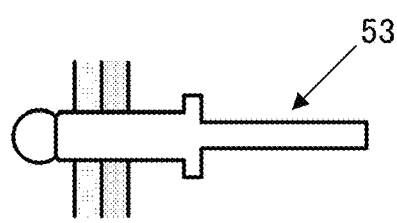
Figure 30D:
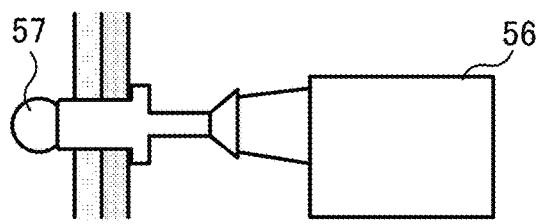
Figure 30E:
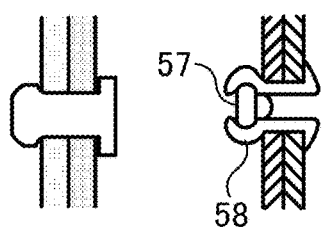

As illustrated in FIG. 30C, when the rivet 53 is inserted and fastened into the hole 51 formed in the metal plate 50, the rivet 53 having a rivet diameter suitable for the hole 51 is extracted, and the extracted rivet 53 is inserted into the hole 51. As illustrated in FIG. 30D, the shaft 55 of the rivet 53 inserted into the hole 51 is pulled out by a riveter 56. As the shaft is pulled, a head portion 57 of the shaft 55 enters into a cylindrical body 58 which is a cylindrical structure around the head portion 57, and the cylindrical body 58 expands in a radial direction thereof as illustrated in FIG. 30E. Lastly, the shaft 55 is cut off and pulled out while the head portion 57 remains in the cylindrical body 58.

Figure 31A:
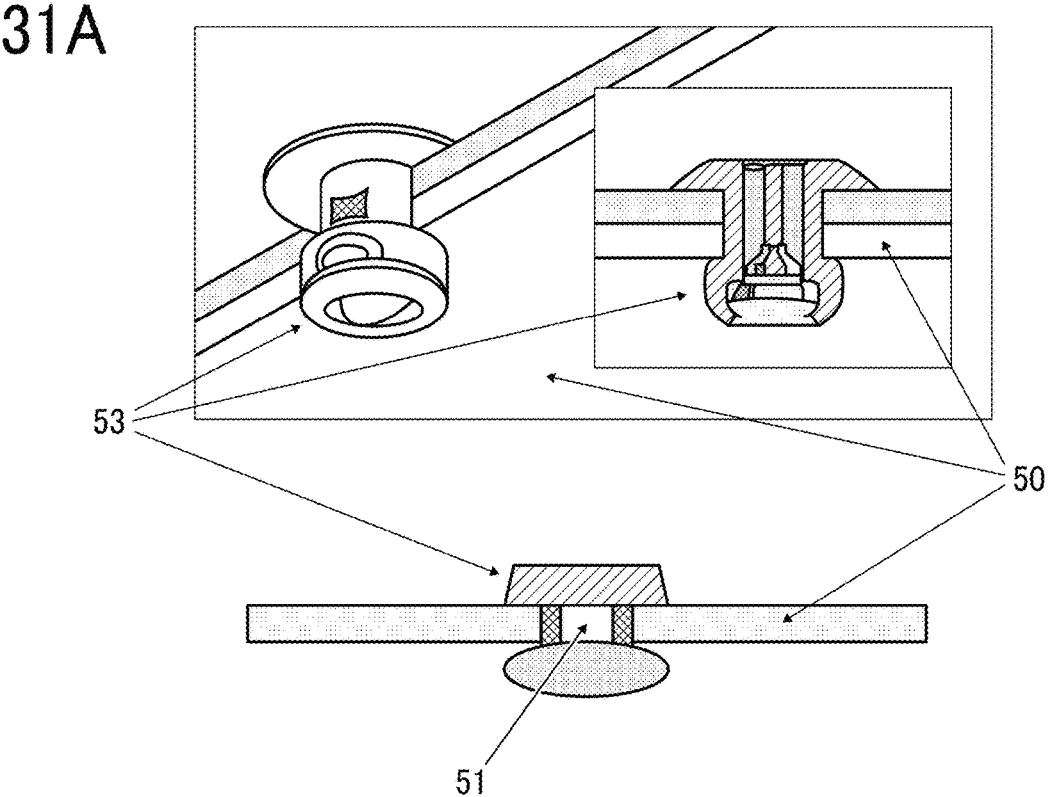
FIGS. 31A to 31C are schematic views of the blind rivet having the lattice structure, which is fastened into a hole of a plate as the fastening target structure.
Figure 31B:
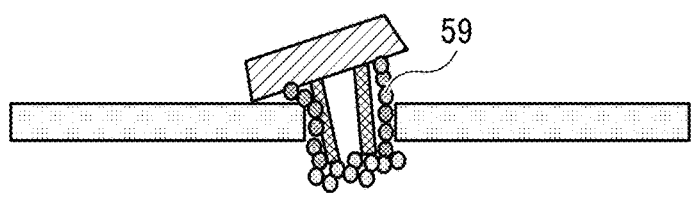
Figure 31C:
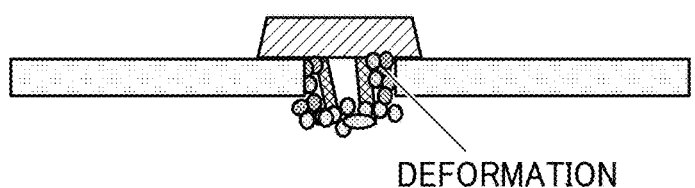

FIGS. 31A to 31C are schematic views of the blind rivet having the DfAM shape in the fastening portion 59, which is fastened to the metal plate 50. FIG. 31A illustrates a normal rivet fastened to the metal plate 50, and FIGS. 31B and 31C illustrates the rivet 53 having the DfAM shape, which is fastened into a deformed hole of the metal plate 50.

When the rivet 53 is obliquely inserted into the hole 51 as illustrated in FIG. 31B, the fastening portion 59 having the DfAM shape follows the shape of the hole 51, is deformed, and is fastened to the metal plate 50 with the fastening condition satisfied.

If the fastening portion 59 does not have the DfAM shape, the rivet 53 is not fastened to the metal plate 50 with a predetermined strength or more as the fastening condition. The fastening portion 59 having the DfAM shape is deformed following the shape of the hole 51 and contacts the hole 51 tightly, thereby fastening the rivet 53 to the metal plate 50 with the fastening force more than the predetermined strength.

Figure 32A:
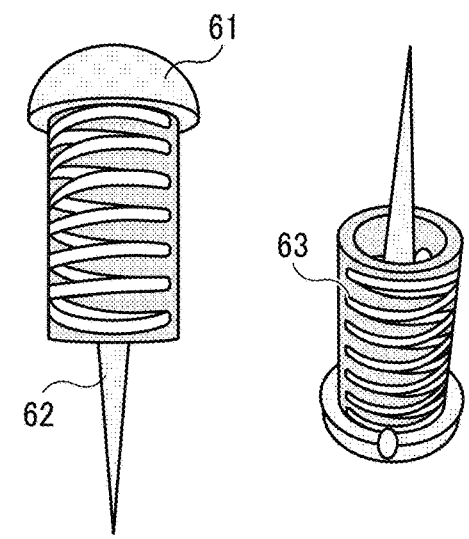
FIGS. 32A to 32C are schematic views of a spring-loaded screw as the fastening structure, which is fastened to a plate as the fastening target structure.
Figure 32B:
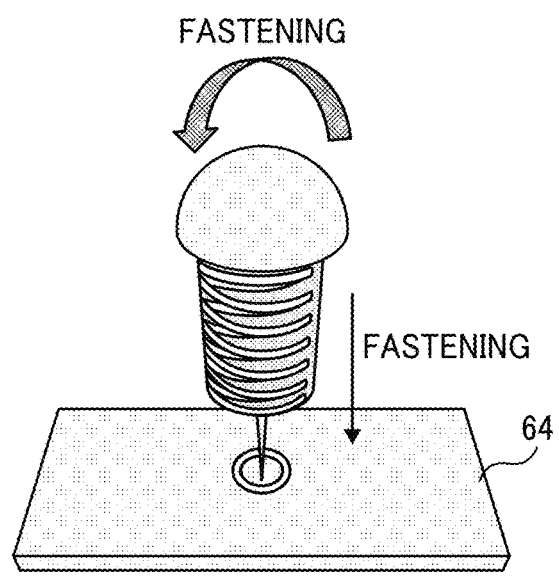
Figure 32C:
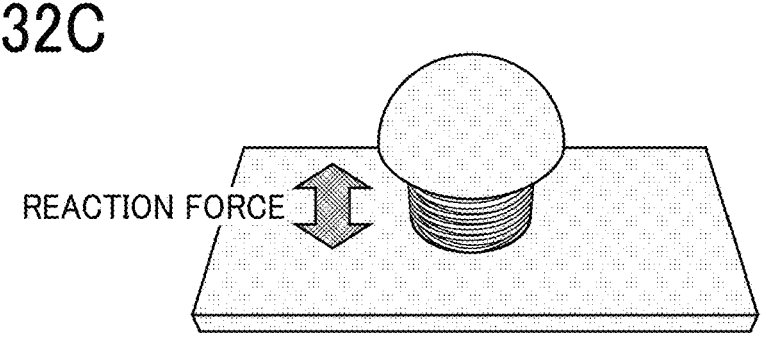

FIGS. 32A to 32C are schematic views of a spring-loaded screw 60 as another example of the fastening structure. The spring-loaded screw 60 illustrated in FIGS. 32A to 32C includes an expanded head portion 61, a rod-shaped insertion portion 62, and a spring 63 wound in a coil shape to which the insertion portion 62 is inserted. The head portion 61 is coupled to the spring 63 as a single body. The insertion portion 62 of the spring-loaded screw 60 is inserted into the plate 64 as the fastening target structure so that the sharp tip of the insertion portion 62 sticks into a plate 64, thereby fastening the spring-loaded screw 60 to the plate 64.

The spring 63 of the spring-loaded screw 60 applies a reaction force between the spring-loaded screw 60 and the plate 64, thereby preventing the spring-loaded screw 60 from being loosened. When the spring-loaded screw 60 is screwed into the plate 64, the coupling between the head portion 61 and the spring 63 is broken, and the head portion 61 is decoupled from the spring 63. The spring 63 applies the reaction force in a direction in which the head portion 61 and the plate 64 are separated from each other to prevent the spring-loaded screw 60 from being loosened.

The management apparatus 15 can create a preferable data for the blind rivet and the spring-loaded screw, by inputting parameters such as the hole diameter and the plate thickness of the fastening target structure to the design tool, based on the measurement results which have been acquired.

Figure 33:
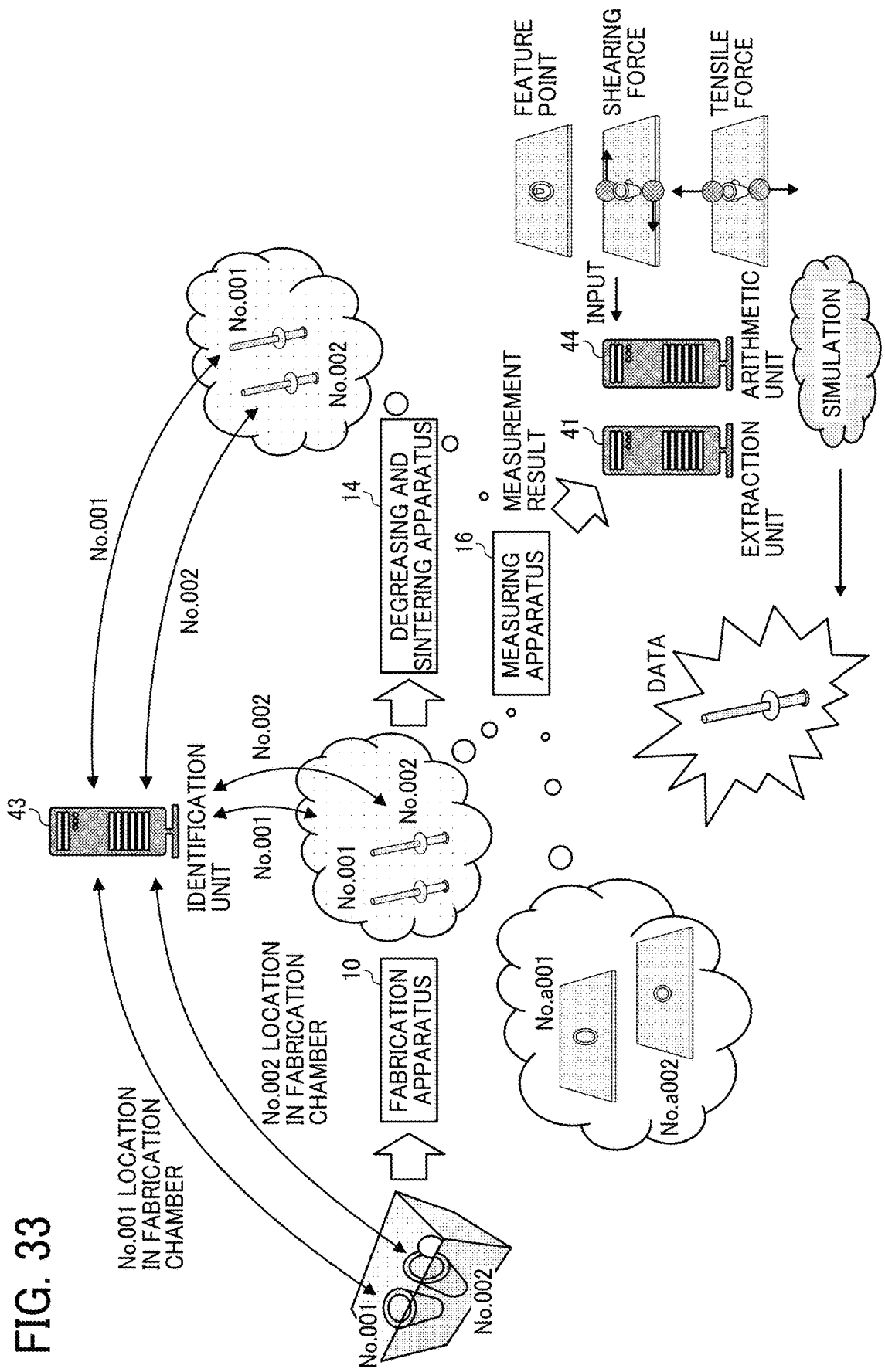
FIG. 33 is a diagram illustrating a second method of determining a product to be manufactured as the fastening structure having the lattice structure in the fastening portion in accordance with the fastening target structure according to an embodiment of the present disclosure.

FIG. 33 is a diagram illustrating a second method of determining a product to be manufactured as the fastening structure having the lattice structure in the fastening portion in accordance with the fastening target structure. In the first method illustrated in FIG. 29, the extraction unit 41 determines the fastening structure based on the measurement result.

When there is a fastening target structure having the same measurement result in the accumulated measurement results, the extraction unit 41 can determine the fastening structure. However, if there is no fastening target structure having the same measurement result in the accumulated measurement results, the extraction unit 41 does not determine the fastening structure without the measurement result.

In the second method, the arithmetic unit 44 creates the estimation model based on the correlation of the accumulated measurement results, receives an input of the fastening condition, and performs a simulation using the created estimation model. Accordingly, the extraction unit 41 can determine a fastening structure suitable for the input fastening condition.

With such a simulation, the management apparatus 15 can determine the fastening structure corresponding to a new fastening condition even if there is no matching example in the past.

As described above, the structures out of the allowable range are normally discarded, but structures that can be combined into a product having an allowable quality are effectively used. Therefore, the management apparatus can reduce the number of structures to be discarded, improve the yield of the structure, and contribute to cost reduction. In addition, the management apparatus 15 extracts a combination of the structures that matches the setting condition, thereby manufacturing a product having an allowable quality.

As described above, according to the present disclosure, a structure out of the allowable range is available without being discarded.

The above-described embodiment is illustrative and does not limit the present disclosure. The above-described embodiment may be modified within a range conceivable by those skilled in the art. The modification includes addition of another element and change or deletion of one of the above-described elements. Such modifications are within the scope of the present disclosure as long as the actions and effects of the present disclosure are provided.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A management apparatus comprising circuitry configured to:
   extract a combination of two or more structures from multiple structures based on shape information of the multiple structures,
   wherein the multiple structures include a fabrication object fabricated by a fabrication apparatus, and include at least one first structure and two or more second structures, and
   wherein the circuitry is further configured to determine which of the two or more second structures is more easily combinable with the at least one first structure from among the two or more second structures after the at least one first structure and the two or more second structures have been sintered.

2. The management apparatus according to claim 1,
   wherein the circuitry is further configured to acquire a measurement result of the multiple structures from a measuring apparatus that measures the multiple structures to obtain the shape information.

3. The management apparatus according to claim 2,
   wherein the circuitry is further configured to:

determine whether each of the multiple structures satisfies a predetermined reference based on the measurement result of the multiple structures, and cause the fabrication apparatus to change a fabrication area of the fabrication apparatus when the circuitry determines that a structure among the multiple structures that does not satisfy the predetermined reference is fabricated in the fabrication area.

4. The management apparatus according to claim 3, wherein the circuitry further configured to cause a system that creates fabrication data for fabricating the fabrication object to exclude, from the fabrication area, an unsatisfied fabrication area in which the structure that does not satisfy the predetermined reference is fabricated.

5. The management apparatus according to claim 2, wherein the circuitry is further configured to:

determine whether each of the multiple structures satisfies a predetermined reference based on the measurement result of the multiple structures, and determine whether to perform a maintenance operation on a production system including the fabrication apparatus based on a determination result of the multiple structures.

6. The management apparatus according to claim 2, wherein the circuitry is further configured to:

determine whether each of the multiple structures satisfies a predetermined reference to determine a satisfied fabrication area in which the multiple structures satisfy the predetermined reference based on the measurement result of the multiple structures, and determine a specified area in which a structure having minimum difference between a designed dimension and a measured dimension is fabricated in the satisfied fabrication area based on a determination result of the multiple structures.

7. The management apparatus according to claim 2, wherein the circuitry is further configured to:

determine whether each of the multiple structures satisfies a predetermined reference based on the measurement result of the multiple structures, and collect the measurement result of a structure in which the circuitry determines the structure that does not satisfy the predetermined reference among the multiple structures.

8. The management apparatus according to claim 2, wherein the multiple structures include multiple first structures and multiple second structures, and the circuitry is further configured to:

determine one or more feature points of the multiple first structures and the multiple second structures included in the measurement result of the multiple first structures and the measurement result of the multiple second structures; and extract a combination of one of the multiple first structures and one of the multiple second structures satisfying a predetermined condition based on information of the one or more feature points.

9. The management apparatus according to claim 8, wherein the circuitry is further configured to:

calculate a first statistical distribution of the one or more feature points of the multiple first structures included in the measurement result of the multiple first structures; and adjust a parameter of a production system including the fabrication apparatus to fabricate the multiple second structures having a second statistical distribution of the one or more feature points that matches the first statistical distribution.

10. The management apparatus according to claim 9, wherein the circuitry uses, as the measurement result of the multiple first structures, information of the one or more feature points of the multiple first structures included in at least one of the measurement result of the multiple first structures fabricated by the fabrication apparatus or the measurement result of the multiple first structures sintered by a sintering apparatus to calculate the first statistical distribution.

11. The management apparatus according to claim 8, wherein the circuitry is further configured to:

calculate a first statistical distribution of the one or more feature points of the multiple first structures included in the measurement result of the multiple first structures; and correct fabrication data of the multiple second structures to fabricate the multiple second structures having a second statistical distribution of the one or more feature points that matches the first statistical distribution calculated.

12. The management apparatus according to claim 11, wherein the circuitry uses, as the measurement result of the multiple first structures, information of the one or more feature points of the multiple first structures included in at least one of the measurement result of the multiple first structures fabricated by the fabrication apparatus or the measurement result of the multiple first structures sintered by a sintering apparatus to calculate the first statistical distribution.

13. The management apparatus according to claim 8, wherein the circuitry uses, as the measurement result of the multiple structures, information of the one or more feature points of the multiple structures included in at least one of the measurement result of the multiple structures fabricated by the fabrication apparatus or the measurement result of the multiple structures sintered by a sintering apparatus to extract the combination of the one of the multiple first structures and the one of the multiple second structures.

14. The management apparatus according to claim 1, wherein the circuitry is further configured to:

perform a simulation of fabrication of the multiple structures in the fabrication apparatus, and extract the combination of two or more structures satisfying a predetermined condition from the multiple structures based on a simulation result.

15. The management apparatus according to claim 14, wherein the circuitry is further configured to:

collect a measurement result of the multiple structures fabricated by the fabrication apparatus and the measurement result of the multiple structures sintered by a sintering apparatus, and perform the simulation based on the measurement result collected of the multiple structures.

16. The management apparatus according to claim 8, wherein the circuitry is further configured to:

store multiple pieces of fastening information to fasten a fastening structure to a fastening target structure; and determine the fastening structure to be fastened to the fastening target structure based on the multiple pieces of fastening information and the measurement result of the one or more feature points of a fastening portion of the fastening target structure, wherein the fastening structure is the one of the multiple first structures having a lattice structure portion, the fastening target structure is the one of the multiple second structures, the fastening structure is fastened to the fastening target structure with the lattice structure portion in contact with a fastening portion of the fastening target structure, and the multiple pieces of fastening information include:
- a measurement result of the fastening structure obtained by measuring one or more feature points of the lattice structure portion of the fastening structure;
- a measurement result of the fastening target structure obtained by measuring one or more feature points of the fastening portion of the fastening target structure; and
- a measurement result of a fastening strength between the fastening structure and the fastening target structure are associated with the measurement result of the fastening structure and the measurement result of the fastening target structure.

17. The management apparatus according to claim 16, wherein the circuitry is further configured to determine the fastening structure to be fastened to the fastening target structure based on:

the multiple pieces of fastening information;

the measurement result of the one or more feature points of the fastening portion of the fastening target structure; and a fastening condition between the fastening structure and the fastening target structure.

18. A production system comprising:

a fabrication apparatus configured to fabricate a fabrication object; and the management apparatus according to claim 1, to manage information related to the combination of two or more structures including the fabrication object fabricated by the fabrication apparatus.

19. The production system according to claim 18, further comprising an output device configured to output the information related to the combination of two or more structures managed by the management apparatus.

20. A management method comprising:

extracting a combination of two or more structures from multiple structures based on shape information of the multiple structures, wherein the multiple structures include a fabrication object fabricated by a fabrication apparatus, and include at least one first structure and two or more second structures; and determining which of the two or more second structures is more easily combinable with the at least one first structure from among the two or more second structures after the at least one first structure and the two or more second structures have been sintered.

* * * * *